(12) United States Patent
Zuteck et al.

(10) Patent No.: US 10,934,995 B2
(45) Date of Patent: *Mar. 2, 2021

(54) BLADES AND SYSTEMS WITH FORWARD BLOWING SLOTS

(71) Applicant: KOHANA TECHNOLOGIES INC., Richmond, CA (US)

(72) Inventors: Michael D. Zuteck, Clear Lake Shores, TX (US); Leigh Zalusky, Vacaville, CA (US); Paul Lees, San Francisco, CA (US)

(73) Assignee: KOHANA TECHNOLOGIES INC., Richmond, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/037,466

(22) Filed: Jul. 17, 2018

(65) Prior Publication Data
US 2018/0328336 A1 Nov. 15, 2018

Related U.S. Application Data

(63) Continuation of application No. 14/853,817, filed on Sep. 14, 2015, now Pat. No. 10,024,300, which is a
(Continued)

(51) Int. Cl.
*F03D 7/02* (2006.01)
*F03D 1/06* (2006.01)

(52) U.S. Cl.
CPC ........... *F03D 1/0675* (2013.01); *F03D 7/022* (2013.01); *F05B 2240/30* (2013.01); *F05B 2250/502* (2013.01); *Y02E 10/72* (2013.01)

(58) Field of Classification Search
CPC ....... F03D 1/0675; F03D 7/022; B64C 21/00; B64C 21/02; B64C 21/04; B64C 23/06; F05B 2250/502
See application file for complete search history.

(56) References Cited

U.S. PATENT DOCUMENTS 2,464,726 A 3/1949 Stalker
3,096,041 A 7/1963 Cheeseman et al.
(Continued)

FOREIGN PATENT DOCUMENTS

CN 104040173 9/2014
EP 1 552 143 7/2005
(Continued)

OTHER PUBLICATIONS

Englar, et al. High output wind driven power generator. Disclosure of Invention. Department of the Navy, Office of Naval research. Apr. 10, 1974.
(Continued)

*Primary Examiner* — Aaron R Eastman
*Assistant Examiner* — Maxime M Adjagbe
(74) *Attorney, Agent, or Firm* — Polsinelli LLP

(57) ABSTRACT

A blade for use in a wind turbine comprises a pressure side and suction side meeting at a trailing edge and leading edge. The pressure side and suction side provide lift to the turbine blade upon the flow of air from the leading edge to the trailing edge and over the pressure side and suction side. The blade includes one or more openings at the suction side, in some cases between the leading edge and the trailing edge. The one or more openings are configured to provide a pressurized fluid towards the leading edge of the blade, in some cases at an angle between about 0° and 70° with respect to an axis oriented from a centerline of the blade toward the leading edge.

20 Claims, 25 Drawing Sheets

Related U.S. Application Data continuation of application No. 13/400,014, filed on Feb. 17, 2012, now Pat. No. 9,133,819.

(60) Provisional application No. 61/509,060, filed on Jul. 18, 2011, provisional application No. 61/548,186, filed on Oct. 17, 2011, provisional application No. 61/589,237, filed on Jan. 20, 2012.

(56) References Cited

U.S. PATENT DOCUMENTS

| | | | |
|---|---|---|---|
| 3,348,618 | A | 10/1967 | Flint et al. |
| 3,525,577 | A | 8/1970 | Cheeseman et al. |
| 3,830,450 | A | 8/1974 | Williams et al. |
| 4,197,053 | A | 4/1980 | Reinke |
| 4,316,698 | A | 2/1982 | Bertoia |
| 4,387,869 | A | 6/1983 | Englar et al. |
| 4,457,480 | A | 7/1984 | Englar et al. |
| 4,474,536 | A | 10/1984 | Gougeon et al. |
| 4,504,192 | A | 3/1985 | Cyrus et al. |
| 4,507,050 | A | 3/1985 | Jeffery et al. |
| 4,557,666 | A | 12/1985 | Baskin et al. |
| 4,799,859 | A | 1/1989 | Zimmer |
| 5,106,265 | A | 4/1992 | Holzem |
| 5,207,556 | A | 5/1993 | Frederick et al. |
| 5,256,034 | A | 10/1993 | Sultzbaugh |
| 5,306,554 | A | 4/1994 | Harrison et al. |
| 5,435,693 | A | 7/1995 | Shaffer |
| 5,529,458 | A | 6/1996 | Humpherson |
| 5,755,408 | A * | 5/1998 | Schmidt ............... B64C 21/00 244/130 |
| 5,791,601 | A | 8/1998 | Dancila et al. |
| 5,813,625 | A | 9/1998 | Hassan et al. |
| 5,863,090 | A | 1/1999 | Englar |
| 5,908,217 | A | 6/1999 | Englar |
| 6,068,328 | A | 5/2000 | Gazdzinski |
| 6,132,181 | A | 10/2000 | McCabe |
| 6,142,425 | A | 11/2000 | Armanios et al. |
| 6,174,135 | B1 | 1/2001 | Lee |
| 6,176,678 | B1 | 1/2001 | Brainch et al. |
| 6,179,077 | B1 | 1/2001 | Burdges et al. |
| 6,203,269 | B1 | 3/2001 | Lorber et al. |
| 6,234,751 | B1 | 5/2001 | Hassan et al. |
| 6,254,347 | B1 | 7/2001 | Shaw et al. |
| 6,334,753 | B1 | 1/2002 | Tillman et al. |
| 6,551,062 | B2 | 4/2003 | Leeke et al. |
| 6,551,063 | B1 | 4/2003 | Lee et al. |
| 6,609,891 | B2 | 8/2003 | Leeke et al. |
| 6,715,988 | B2 | 4/2004 | Leeke et al. |
| 6,866,234 | B1 | 3/2005 | Hassan et al. |
| 6,911,744 | B2 | 6/2005 | Roskey |
| 6,927,503 | B2 | 8/2005 | Enis et al. |
| 6,940,185 | B2 | 9/2005 | Andersen et al. |
| 7,066,717 | B2 | 6/2006 | Morrison et al. |
| 7,104,498 | B2 | 9/2006 | Englar et al. |
| 7,199,486 | B2 | 4/2007 | Roskey |
| 7,217,091 | B2 | 5/2007 | Lemieux |
| 7,323,791 | B2 | 1/2008 | Jonsson |
| 7,344,360 | B2 | 3/2008 | Wetzel |
| 7,354,247 | B2 | 4/2008 | Bonnet |
| 7,387,491 | B2 | 6/2008 | Saddoughi et al. |
| 7,387,492 | B2 | 6/2008 | Pang et al. |
| 7,663,262 | B2 | 2/2010 | Roskey |
| 7,665,968 | B2 | 2/2010 | Mongillo, Jr. et al. |
| 7,708,229 | B1 * | 5/2010 | Angle, II ............... B64C 21/08 244/206 |
| 7,785,076 | B2 | 8/2010 | Morrison et al. |
| 7,832,689 | B2 | 11/2010 | Prince et al. |
| 7,857,588 | B2 | 12/2010 | Propheter-hinckley et al. |
| 7,883,313 | B2 | 2/2011 | Nies et al. |
| 7,909,575 | B2 * | 3/2011 | Barbu ............... F03D 7/022 416/1 |
| 9,133,819 | B2 | 9/2015 | Zuteck |
| 9,162,754 | B2 | 10/2015 | Boespflug et al. |
| 10,024,300 | B2 | 7/2018 | Zuteck |
| 2006/0187593 | A1 | 8/2006 | Mahawili |
| 2007/0231151 | A1 | 10/2007 | Herr et al. |
| 2009/0028705 | A1 | 1/2009 | Meldgaard |
| 2009/0074574 | A1 | 3/2009 | Godsk et al. |
| 2009/0196763 | A1 | 8/2009 | Jones et al. |
| 2009/0285691 | A1 | 11/2009 | Grabau |
| 2010/0014970 | A1 | 1/2010 | Bove et al. |
| 2010/0104436 | A1 | 4/2010 | Herr et al. |
| 2010/0119374 | A1 | 5/2010 | Wood |
| 2010/0143122 | A1 | 6/2010 | Nies et al. |
| 2010/0143146 | A1 | 6/2010 | Bell et al. |
| 2010/0158661 | A1 | 6/2010 | Dawson et al. |
| 2010/0209258 | A1 | 8/2010 | Fugslang et al. |
| 2010/0215484 | A1 | 8/2010 | Mahawili |
| 2010/0266382 | A1 | 10/2010 | Campe et al. |
| 2010/0296940 | A1 | 11/2010 | Zuteck |
| 2010/0322760 | A1 | 12/2010 | Morrison et al. |
| 2011/0018268 | A1 | 1/2011 | Snel et al. |
| 2011/0103953 | A1 | 5/2011 | Haans et al. |
| 2011/0142595 | A1 | 6/2011 | Santiago et al. |
| 2011/0206506 | A1 | 8/2011 | Nies et al. |
| 2012/0020803 | A1 | 1/2012 | Lees |
| 2013/0022463 | A1 | 1/2013 | Zuteck |
| 2013/0022477 | A1 | 1/2013 | Lees |
| 2016/0102651 | A1 | 4/2016 | Zuteck |

FOREIGN PATENT DOCUMENTS

| | | |
|---|---|---|
| EP | 1 674 723 | 6/2006 |
| EP | 2 320 071 | 5/2011 |
| EP | 2 769 092 | 8/2014 |
| GB | 02186033 | 8/1987 |
| IN | 3952/DELNP/2014 A | 2/2015 |
| WO | WO 2004/094817 | 11/2004 |
| WO | WO 2006/052278 | 5/2006 |
| WO | WO 2007/094753 | 8/2007 |
| WO | WO 2009/054714 | 4/2009 |
| WO | WO 2009/075865 | 6/2009 |
| WO | WO 2010/093621 | 8/2010 |
| WO | WO 2010/093624 | 8/2010 |
| WO | WO 2010/093628 | 8/2010 |
| WO | WO 2010/135593 | 11/2010 |
| WO | WO 2011/053119 | 5/2011 |
| WO | WO 2012/112613 | 8/2012 |
| WO | WO 2013/059376 | 4/2013 |

OTHER PUBLICATIONS

Englar. Circulation control pneumatic aerodynamics: blown force and moment augmentation and modification; past, present & future. AIAA paper. Fluids 200. Jun. 19-22, 2000.

Englar. Overview of Circulation Control Pneumatic Aerodynamics: Blown Force and Moment Augmentation and Modification as Applied Primarily to Fixed-Wing Aircraft. Chapter 2 in Applications of Circulation Control Technology, Joslin, R.D. and G.S. Jones, editors, AIAA Progress in Aeronautics and Astronautics, vol. 214, Jun. 2006.

Sankar, et al. Numerical simulations of the aerodynamics of circulation control wind turbines under yawed flow conditions. Proceedings of ASME Turbo Expo 2010: Power for land, sea and air. Jun. 14-18, 2010. 1-9.

European Patent Application No. 12842248.2 EP Examination Report dated Sep. 11, 2017.

European Patent Application No. 12842248.2 EP Extended Search Report dated Apr. 23, 2015.

PCT Application No. PCT/US2012/025127, International Search Report dated Sep. 28, 2012.

PCT Application No. PCT/US2012/025127, Written Opinion dated Sep. 28, 2012.

PCT Application No. PCT/US2012/060690, International Search Report and Written Opinion dated Feb. 8, 2013.

Chinese Patent Application No. 201280062404.2 Second Office Action dated Feb. 4, 2017.

Chinese Patent Application No. 201280062404.2 First Office Action dated Jun. 2, 2016.

(56) References Cited

OTHER PUBLICATIONS

U.S. Appl. No. 13/552,553, Office Action dated Dec. 4, 2013.
U.S. Appl. No. 13/185,459, Office Action dated Mar. 13, 2015.
U.S. Appl. No. 13/185,459, Final Office Action dated Mar. 13, 2014.
U.S. Appl. No. 13/185,459, Office Action dated Jul. 31, 2013.
U.S. Appl. No. 13/185,459, Final Office Action dated Nov. 7, 2012.
U.S. Appl. No. 13/185,459, Office Action dated Feb. 15, 2012.
U.S. Appl. No. 13/400,014, Office Action dated Jan. 16, 2015.
U.S. Appl. No. 14/853,817, Office Action dated Nov. 15, 2017.

* cited by examiner

BLADES AND SYSTEMS WITH FORWARD BLOWING SLOTS

CROSS-REFERENCE TO RELATED APPLICATIONS

This is a continuation and claims the priority benefit of U.S. patent application Ser. No. 14/853,817 filed Sep. 14, 2015, now U.S. patent Ser. No. 10/024,300, which is a continuation and claims the priority benefit of U.S. patent application Ser. No. 13/400,014 filed Feb. 17, 2012, now U.S. Pat. No. 9,133,819, which claims priority benefit to U.S. Provisional Patent Application No. 61/509,060, filed Jul. 18, 2011, U.S. Provisional Patent Application Ser. No. 61/548,186, filed Oct. 17, 2011, and U.S. Provisional Patent Application Ser. No. 61/589,237, filed Jan. 20, 2012, the entirety of which are incorporated herein by reference.

STATEMENT AS TO FEDERALLY SPONSORED RESEARCH

This invention was made with Government support under DE-AR0000022 awarded by the United States Department of Energy. The Government has certain rights in the invention.

BACKGROUND OF THE INVENTION

An airfoil (or aerofoil) is the cross-sectional shape of a wing or blade or sail. An airfoil-shaped body that is moved through a fluid may produce an aerodynamic force. The component of this force perpendicular to the direction of motion may be called lift. The component of this force parallel to the direction of motion may be called drag.

A turbine is a rotary engine that may extract energy from a fluid flow and convert it into work. Turbines may have one or more moving parts, including a rotary assembly, which is a shaft or drum with blades.

A wind turbine (or wind generator) is a device that may convert kinetic energy from wind or other moving fluid into mechanical energy, which may subsequently be used to generate electricity.

SUMMARY OF THE CLAIMED INVENTION

There are blades and wind turbines available in the art for generating power from wind. However, a limitation of such blades and wind turbines is that, in at least some cases, the energy, resources and cost for manufacturing such blades makes them impractical for commercial use. In particular, in certain cases the costs for manufacturing wind turbines exceeds any cost benefit that may be realized from their use. While the reduction of air pollution and the reduction of green house gases is a huge benefit, if the cost of manufacturing blades is not reduced, other, more convention sources of energy, such as fossil fuel combustion, may be more preferable. Aside from various manufacturing issues, at least some current wind turbines are mechanically complex and require routine maintenance and repair. In particular, certain wind turbines require complex braking systems for regulating the speed at which the blades speed in response to wind speeds. Such braking systems are expensive to manufacture and maintain.

In view of the various limitations associated with current turbine blades and system, recognized herein is the need for systems and methods for reducing the resources required for (and thus the cost of) manufacturing wind turbines. There is also the need for more efficient and mechanically simpler wind turbines, which can advantageously provide for improved wind turbine output and reduced operating and maintenance costs and expenses.

Some embodiments describe blades (e.g., turbine blades) that are mechanically simple, highly efficient, structurally strong, cost effective, and controllable for effectively extracting energy from a flowing fluid, such as ambient wind. In some cases, this is accomplished by augmenting or controlling the aerodynamics of turbine blades with the use of pneumatic blowing out of the blades, which may generate forces and extract energy even at substantially low wind velocities. Concurrently, blown blade airfoils are structurally strong and the lift, drag and torque produced by such blades may be made relatively independent of the local relative wind angle, thus eliminating the complex problems of blade pitch and pitch control mechanisms. Devices provided herein may achieve, among other things, substantially high lift on specialized blown blades; drag increase (braking) or reduction (efficiency) as required; control of the aerodynamic moments on these blades; prevention of flow separation on these blades (except when flow separation would be desirable, such as for braking); and the ability to perform all of these capabilities without any physical change in the local blade angle of attack to the oncoming flow. These capabilities allow energy extraction from the ambient wind over a wider range of wind speeds and local wind stream angles of attack on the blades. This will be achieved, for example, with one blowing slot or a plurality of tangential blowing slots located on either end of the individual blade airfoil (leading edge or training edge), and on either side of the airfoil (pressure or suction side). In addition to very high lift and reduced drag, thus high aerodynamic lift/drag ratios and efficiency, these characteristics may be varied by the adjustment of only the blade blowing rates or blowing pressures at these slots.

Blades, systems and methods provided herein can reduce, if not eliminate, the need for blade twist; blade chord change or local planform area variation (taper); blade camber; and blade variable airfoil geometry, all of which would typically change along the blade span to account for different local wind speeds and wind angles at the various blade radial locations. In some situations, variations in the types of blown airfoils are provided to account for various local conditions.

Pneumatic blades configured to generate aerodynamic lift independent of mechanical angle of attack change are described herein. In some cases, blades are configured for use with wind turbines. In other cases, blades are configured for use with helicopters, airplanes, automobiles and other devices or structures where aerodynamic lift is used. These pneumatic blades may also be used to generate negative lift (i.e., downward lift from the pressure side of the blade section) so as to produce aerodynamic braking. In some embodiments, pneumatics change the aerodynamics of the blade section characteristics without mechanical blade pitch change, which enables variations of turbine blade aerodynamic characteristics along the rotor blade without any mechanical blade pitch change.

In an aspect of the invention, a blade for use in a wind turbine comprises a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces; and one or more openings at the suction side, the one or more openings configured to provide a pressurized fluid towards the leading edge of the blade at an angle between about 0° and 70° with respect to an axis oriented from a centerline of the blade toward the leading edge—i.e., an axis running from the trailing edge to the leading edge, with an angle of 0 degrees from this axis representing a direction towards the leading edge, an angle of 90 degrees representing an angle perpendicular to the blade, and an angle of 180 degrees representing a direction towards the trailing edge. In an embodiment, the one or more openings are configured to provide the pressurized fluid at an angle between about 0° and 45° with respect to the axis. In another embodiment, the one or more openings are directed at an angle between about 0° and 25°. In another embodiment, the one or more forward blowing slots are disposed at or adjacent to a midline of the blade. In another embodiment, the one or more forward blowing slots are disposed at or adjacent to the leading edge of the blade. In another embodiment, the one or more forwards blowing slots are disposed between the leading edge and the trailing edge. In another embodiment, the one or more forwards blowing slots are disposed at or adjacent to the trailing edge.

In another aspect of the invention, a blade for use in a wind turbine comprises a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces; and one or more forward blowing slots on the suction side, the one or more forward blowing slots for adjusting the lift and drag of the blade. In an embodiment, the one or more forward blowing slots are depressed in surface of the suction side. In another embodiment, the one or more forward blowing slots are at or above a surface of the suction side. In another embodiment, the blade comprises two or more forward blowing slots. In another embodiment, the blade comprises three or more forward blowing slots. In another embodiment, the blade comprises four or more forward blowing slots. In another embodiment, the blade comprises five or more forward blowing slots. In another embodiment, the blade comprises ten or more forward blowing slots. In another embodiment, the one or more forward blowing slots are disposed at or adjacent to the trailing edge. In another embodiment, the one or more forward blowing slots are disposed at or adjacent to a midline of the blade. In another embodiment, the one or more forward blowing slots are disposed at or adjacent to the leading edge. In another embodiment, the one or more forward blowing slots are disposed between the leading edge and the trailing edge.

In another aspect of the invention, a blade for use in a wind turbine comprises a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces; and one or more openings at the suction side and between the leading edge and trailing edge, the one or more openings configured to provide a pressurized fluid over the suction side and towards the leading edge of the blade, the one or more openings for causing flow separation over the blade. In an embodiment, the one or more openings are located in aft third of an airfoil of the blade. In another embodiment, the one or more openings are located in a mid third of an airfoil of the blade. In another embodiment, the one or more openings are located in a front third of an airfoil of the blade.

In another aspect of the invention, a blade for use in a wind turbine comprises (a) a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces; and (b) one or more forward blowing slots on the suction side, the one or more forward blowing slots for decreasing lift and increasing drag for load, power and safety control. In an embodiment, the forward blowing slots are located in aft third of an airfoil of the blade. In another embodiment, the forward blowing slots are located in a mid third of an airfoil of the blade. In another embodiment, the forward blowing slots are located in a front third of an airfoil of the blade for maximum effect in rotor stopping.

In another aspect of the invention, a blade for use in a wind turbine comprises a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces; a forward blowing slot on the suction side, the forward blowing slot for providing a pressurized fluid towards a leading edge of the blade during operation of the wind turbine, the forward blowing slot in fluid communication with one or more cavities within the blade for communicating the pressurized fluid to the forward blowing slot; and a backflow valve located in a fluid flow path between the one or more cavities and the forward blowing slot, the backflow valve for regulating the flow of a centrifugally induced fluid from a location external to the blade and into the one or more cavities. In an embodiment, the backflow valve comprises a valve card oriented along a spanwise direction of the blade. In another embodiment, the backflow valve comprises a forward facing contoured external closure flap covering an exit of the forward blowing slot. In another embodiment, the blade further comprises a plurality of pivoting louvers that follow airfoil contour and prevent backflow. In another embodiment, the backflow valve is a one way flap valve preventing backflow. In another embodiment, the backflow valve is a pivoting plate valve for preventing backflow. In another embodiment, the backflow valve comprises another pivoting plate valve for preventing backflow.

In another aspect of the invention, a method for controlling a wind turbine comprises providing a blade operatively coupled to a rotor hub (also "hub" herein) of the wind turbine, the blade comprising: (a) a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces; and (b) one or more forward blowing slots located on the suction side of the blade for providing a pressurized fluid towards a leading edge of the blade during operation of the wind turbine, the one or more forward blowing slots in fluid communication with one or more cavities in the blade for communicating a pressurized fluid to the one or more forward blowing slots. The method further comprises providing a pressurized fluid, and directing the pressurized fluid to the one or more cavities. The pressurized fluid is then directed from the one or more cavities to the one or more forward blowing slots, thereby controlling the wind turbine. In an embodiment, controlling the wind turbine comprises decreasing lift and increasing drag for load, power and safety control. In another embodiment, controlling the wind turbine comprises causing separation of flow over airfoils of the blade. In another embodiment, the wind turbine is controlled without blade pitch. In another embodiment, the wind turbine is controlled with a combination of mechanical blade pitching and forwards blowing slots. In another embodiment, the one or more forward blowing slots include a plurality of forward blowing slots. In another embodiment, controlling the wind turbine comprises separately controlling additional rotor stop ducting and forwards blowing slots in a forwards part of an airfoil of the blade. In another embodiment, the pressurized fluid is directed from the one or more cavities to the one or more forward blowing slots to stop a rotor of the wind turbine with centrifugal pumping from within the blade. In another embodiment, the method further comprises regulating backflow into the one or more cavities by balancing an air flow velocity at the suction side with centrifugal pumping pressure. In another embodiment, the pressurized fluid is provided by centrifugal pumping due to the blades rotation alone. In another embodiment, the flow of the pressurized fluid is regulated with the aid of one or more valves at the root of the blade.

In another aspect of the invention, a method for controlling a wind turbine comprises providing a blade operatively coupled to a hub of the wind turbine, the blade comprising: (a) a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces; and (b) one or more forward blowing slots for providing a pressurized fluid towards a leading edge of the blade during operation of the wind turbine, the one or more forward blowing slots in fluid communication with one or more cavities in the blade for communicating a pressurized fluid to the one or more forward blowing slots. The method further comprises balancing suction side airflow velocity against centrifugal pumping pressure, thereby minimizing backflow through the one or more forward blowing slots. In an embodiment, the one or more forward blowing slots protrude above the suction side surface.

In another aspect of the invention, a method for operating a wind turbine comprises providing one or more blades, an individual blade of the one or more blades as in any of the blades described above, alone or in combination, and generating power with the aid of a turbine generator coupled to the one or more blades.

In another aspect of the invention, a blade for use in a wind turbine comprises a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces. The blade includes one or more slots for providing a fluid towards the leading edge of the blade (also "forward blowing slots" herein). The one or more slots can be disposed on the suction side of the blade. Upon the application of pressurized air through the one or more forward blowing slots, the one or more forward blowing slots decrease lift and increase draft for load, power and safety control. In an embodiment, the forward blowing slots are located in aft third of an airfoil of the blade. In another embodiment, the forward blowing slots are located in a mid third of an airfoil of the blade. In another embodiment, the forward blowing slots are located in a front third of an airfoil of the blade for maximum effect in rotor stopping.

In another aspect of the invention, a blade for use in a wind turbine comprises a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces. The blade further comprises a forward blowing slot on the suction side, the forward blowing slot for providing a pressurized fluid towards a leading edge of the blade during operation of the wind turbine, the forward blowing slot in fluid communication with one or more cavities within the blade for communicating the pressurized fluid to the forward blowing slot. A backflow valve is located in a fluid flow path between the one or more cavities and the forward blowing slot. The backflow valve is for regulating the flow of a centrifugally induced fluid from a location external to the blade and into the one or more cavities. In an embodiment, the backflow valve comprises a valve card oriented along a spanwise direction of the blade. In another embodiment, the backflow valve comprises a forward facing contoured external closure flap covering an exit of the forward blowing slot. In another embodiment, the blade further comprises a plurality of pivoting louvers that follow airfoil contour and prevent backflow. In another embodiment, the backflow valve is a one way flap valve preventing backflow. In another embodiment, the backflow valve is a pivoting plate valve for preventing backflow. In another embodiment, the blade comprises another pivoting plate valve for preventing backflow.

In another aspect of the invention, a method for controlling a wind turbine comprises providing a blade operatively coupled to a hub of the wind turbine. The blade can be attached to the hub via a securing member, such as one or more screws or fasteners, or can be unitary (or single-piece) with the hub. The blade comprises a pressure side and suction side meeting at, a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces. The blade includes one or more forward blowing slots for providing a pressurized fluid towards a leading edge of the blade during operation of the wind turbine. The one or more forward blowing slots are in fluid communication with one or more cavities in the blade for communicating a pressurized fluid to the one or more forward blowing slots. Next, suction side airflow velocity is balanced against centrifugal pumping pressure, thereby minimizing backflow through the one or more forward blowing slots. In an embodiment, the one or more forward blowing slots protrude above the suction side surface.

In some embodiments, blades above, alone or in combination, are non-aerodynamic.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
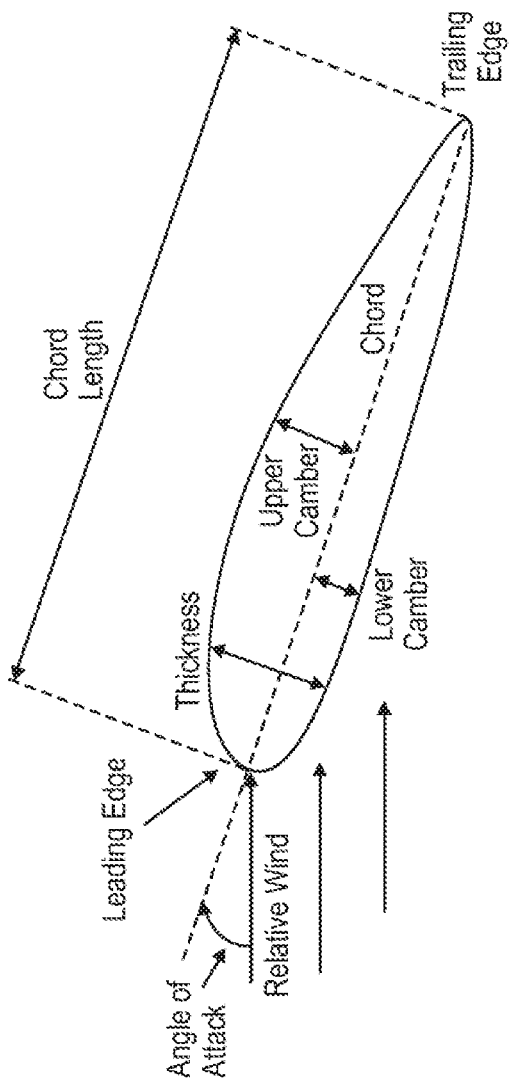
FIG. 1 schematically illustrates a blade airfoil section.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed in practicing the invention.

The term "fluid," as used herein, refers to a gas or liquid. In some embodiments, a fluid is a gas or liquid having low or substantially low viscosity. A fluid may include, for example, air, oxygen, hydrogen, water vapor, an inorganic liquid, or an organic liquid, such as liquid water, an alcohol, an aldehyde, or a ketone. A fluid has various fluid properties, such as heat capacity, viscosity, temperature, pressure and flow rate.

The term "lift," as used herein, refers to aerodynamic or hydrodynamic lift. Lift is the component of aerodynamic force perpendicular to the direction of motion of the airfoil or blade section. "Ineffective lift" means that the fluid flow around the airfoil or blade is operating in a separated-flow or stalled-flow region. Blades and systems provided herein improve upon such ineffective lift by re-attaching the flow field or causing the blade section to perform in a more efficient aerodynamic manner. In some situations, this is achieved by using pneumatics and blown passages to re-attach separated or stalled flow, or by use pneumatics to effectively eliminate the need for mechanical blade angle of attack change (pitch).

The term "non-aerodynamic," as used herein, refers to a blade or blade section that is structurally less aerodynamic than a comparable blade with geometric features that effect improved aerodynamics. In an example, a non-aerodynamic blade has a root/inboard section (e.g., 40% or 50% of the span, as measured from the root) which has a chord that varies by at most about 5%. Such a blade inboard section operates in a region of ineffective aerodynamic flow, which includes flow separation and/or stalled flow. The aerodynamics of such a blade inboard section, including the effective (or virtual shape) of the blade inboard section, is adjusted (e.g., increased lift or decreased lift) with the aid of one or more pneumatic blowing slots in the blade inboard section. The aerodynamics of such non-aerodynamic blade inboard sections may thus be improved with the aid of pneumatic blowing.

The term "drag," as used herein, refers to the component of aerodynamic or hydrodynamic force parallel to the direction of motion of the airfoil or blade section.

The term "blade," as used herein, refers to an object that is configured to generate lift upon the flow of a fluid over surfaces of the blade. A blade may have a pressure side, suction side, leading edge and trailing edge. The pressure side and suction side are for generating lift with the flow of fluid (e.g., air) over the blade. In some instances, a blade is used to provide mechanical motion to a turbine generator. In such context, the blade may be referred to as a "turbine blade".

The term "airfoil" (or "aerofoil" or "airfoil section"), as used herein, refers to the cross-sectional shape of a blade. A blade may have one or more airfoils. In an example, a blade has a cross-section that is constant along a span of the blade, and the blade has one airfoil. In another example, a blade has a cross-section that varies along a span of the blade, and the blade has a plurality of airfoils.

The term "planform," as used herein, refers to the shape of the blade viewed from a top-down standpoint defined by airfoil positions and chord lengths.

The term "passageway," as used herein, refers to a conduit, channel or other structure configured to direct a fluid from one point to another. A fluid flows through a passageway in various flow configurations, such as, e.g., turbulent or laminar flow. A passageway is generally in fluid communication with one or more other passageways or orifices.

The term "orifice," as used herein, refers to a hole or opening configured to direct a fluid from a chamber or a passageway to an external environment or another chamber or passageway. An orifice may have various shapes, sizes and configurations. In an example, an orifice is circular, oval, elliptical, triangular, square, rectangular, pentagonal, hexagonal, heptagonal, nonagonal, decagonal, or partial segments (e.g., semi-circular, semi-rectangular) of these shapes. In another example, an orifice is a slit. An "orifice" may also be referred to as a "slot."

The term "forward blown slot" (also "forward blowing slot" herein), as used herein, refers to a passage or orifice for providing a pressurized fluid directed toward the leading edge of a blade.

The term "reverse blowing slot" (also "reverse blown slot" herein), as used herein, refers to a passage or orifice for providing a pressurized fluid directed toward the trailing edge of a blade.

The term "blowing," as used herein, refers to the application of a pressurized fluid, such as pressurized air, through one or more orifices or openings in fluid communication with a pressure side and/or suction side of a blade. Blowing in some cases refers to the act or process of providing a pressurized and/or moving fluid, such as a pressurized gas or liquid, through an orifice. In an example, blown air includes pressurized air.

The term "span," as used herein, refers to the radial distance from a root of a blade towards a tip portion of the blade.

The term "chord," as used herein, refers to the distance from a leading edge of a blade airfoil section to a trailing edge of the blade airfoil section. Blades provided herein may have constant chords as measured along a span of the blade.

The term "suction side," as used herein, refers to the low pressure side of a blade. The term "pressure side", as used herein, refers to the high pressure side of a blade. Upon the flow of air or other fluid over the blade, the fluid pressure at the pressure side may be generally greater than the fluid pressure at the suction side.

The term "leading edge," as used herein, refers to a portion of a blade that faces the direction of flow of a fluid.

The term "trailing edge," as used herein, refers to a section of a blade that faces (or is oriented) downstream in relation to the direction of flow of a fluid over the blade.

The term "turbine," as used herein, refers to a machine, device or system that generates power when a wheel or rotor hub (also "hub" herein) fitted with vanes or blades is made to revolve within the flow of a fluid. A turbine configured to generate power from wind is referred to as a "wind turbine" herein. In some cases, a turbine includes a power generator, such as an induction generator, for converting mechanical energy to electricity (or power).

The term "pitch," as used herein, refers to the blade airfoil section angle of attack relative to the local wind-stream direction. On some conventional wind turbines, it is varied either mechanically by a pitch change mechanism or by blade twist, both of which may be used to change the blade airfoil section's local aerodynamic characteristics to make the blade operate more efficiently aerodynamically. In some embodiments, this required change in local blade section aerodynamics is achieved pneumatically by orifice blowing without any mechanical pitch mechanism or blade twist to achieve the same or better aerodynamic efficiency as the conventional wind turbine.

Current wind turbines experience a number of special problem areas which can limit their range of operational wind speeds; make the mechanisms complex, heavy and costly; and limit the amount of electrical power that they can realistically capture. Pneumatic aerodynamic blades provided herein may address performance, mechanical, and structural issues, and help solve most, if not all problems associated with current wind turbines without the use of pitching and varying-geometry blades. Pitching mechanisms may still be used in combination with pneumatic control systems.

Some embodiments provide blades for generating aerodynamic or hydrodynamic lift, which in some cases is used to provide mechanical motion to a turbine. In some situations, blades are adapted to become more aerodynamic by employing the flow of air through one or more passageways (or channels) and out of one or more orifices in the blades. In some implementation, blades provided herein are used for generating electricity, such as by employing the generation of lift to turbine blades operatively coupled to a turbine generator. In other implementation, blades provided herein are used with other devices for generating lift (or reducing drag), such as helicopters, airplanes, automobiles, cars, truck trailers and other devices or structures in which aerodynamic lift is desired. In some embodiments, turbine blades and systems employ the capabilities of pneumatic or hydrodynamic blown airfoils on the rotor to pneumatically vary all aerodynamic or hydrodynamic forces and moments (primarily lift, drag, and pitch, but also side force, roll, and yaw if and when needed) without the need for variations in blade pitch change (angle of attack) or variations in blade twist, chord length, area, or airfoil geometry with variation in local rotor blade location. This may account for all changes in local flow field characteristics due to blade rotation, blade spanwise location, local inflow angles, local wind-speed or wind over-speeds.

Figure 2:
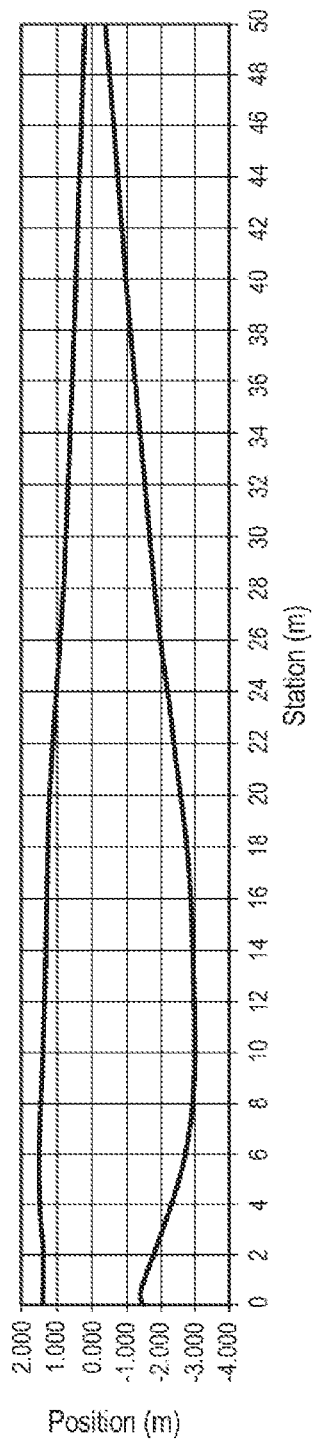
FIG. 2 shows a typical blade planform view.

Recognized herein are various limitations associated with current blades for use with wind turbines. FIG. 1 shows a cross-section of a blade having a leading edge, trailing edge, suction side (top) and pressure side (bottom), as is found in at least some blades currently available. The blade has a chord length (also "chord" herein) and a span, which is measured from a root to a tip portion of the blade, as measured along an axis orthogonal to the plane of the page. FIG. 2 shows a blade planform that is representative of the planform of at least some current blades. The position along the blade from a root of the blade to a tip of the blade is measured along the spanwise or radial (horizontal) axis ("Station"). The leading edge is at the top of the planform and the trailing edge is at the bottom of the planform. In some cases, a chord of the blade is measured along the vertical axis with reference to the horizontal axis ("Position"). For example, at about 24 meters ("m") from the root of the blade, the blade has a chord of about 3 m. The blade has a length that is about 50 m. The tip of the blade is slightly trimmed off; that is, at the tip of the blade the leading edge and the trailing edge do not converge. The flow of a fluid—such as, e.g., air—from the leading edge (FIG. 2, top) to the trailing edge (FIG. 2, bottom) generates aerodynamic lift on the blade. The chord of the blade of FIG. 2 at the root of the blade is about 3 m.

While in some cases the blades of FIGS. 1 and 2 are configured to provide aerodynamic lift, in some situations, such blades are expensive to manufacture and maintain, leading to increased installation and/or maintenance costs. In addition, operating such blades may require complex braking and control systems to enable and disable the rotation of a turbine having a plurality of the blades, and to provide for optimum blade configuration (e.g., pitch) for extracting energy from wind. For instance, to reduce or stop the spinning of a turbine having the blades of FIGS. 1 and 2 may require a braking system, leading to system complexity that may in turn lead to increased costs.

In addition, the blades of FIGS. 1 and 2, to achieve preferable efficiencies, in some cases require structural features that minimize flow separation over the suction sides of the blades. For example, the root/inboard portions of the blades include twists to make the root sections aerodynamic. Such structural features, however, are expensive to manufacture, leading to increased costs for installing such blades. The growing chord lengths of the root portions of current blades as the span increases pushes the limits of the current manufacturing techniques for wind turbine blades.

There is recognized herein a need for improved blades and turbines that provide for reduced cost and improved efficiency with respect to current blades and systems.

Some embodiments describe mechanically simple, highly efficient, structurally strong, cost effective, and controllable aerodynamic turbine blades to extract energy from a flow of a fluid, such as wind (e.g., air), over turbine blades. In some embodiments, this is accomplished by augmenting or controlling the aerodynamics of turbine blades with the aid of pneumatic blowing ("blown blades") through one or more orifices in the blades, which generate forces and extracts energy even at moderate, low or substantially low wind velocities. Blown blades provided herein are structurally strong; the lift, drag and torque produced by such blades are configured to be relatively independent of the local relative wind angle, thus reducing, if not eliminating, problems of blade pitch and pitch control mechanisms. Blown blades provided herein advantageously enable the economical, widespread use of wind turbines, which is not possible with at least some blades and turbines currently available. This advantageously decreases a dependence on fossil fuels as a source of energy, which in turn aids in reducing pollution (e.g., $SO_x$, $NO_x$, smog, particulate matter) and various issues associated with global warming.

Turbine blades and devices described in various embodiments of the invention achieve substantially high lift on specialized blown blades and drag adjustment, such as, e.g., increasing drag to effect braking or reducing drag to improve efficiency. In addition, systems provided herein provide control over the aerodynamic moments on blades, prevention of flow separation on blades (except when flow separation is desirable, such as for braking), and the ability to perform all of these capabilities without any physical change in the local blade angle of attack to the oncoming flow. These capabilities allow energy extraction from a flowing fluid over a wide range of fluid flow velocities and angles of attack on the blades. In some embodiments, this is achieved with the aid of one or more perpendicular blowing slots, tangential blowing slots, or blowing slots with exit angles between vectors tangential and orthogonal to the blade surface. Such slots are located on either end of an individual blade (i.e., root or tip), on either end of the airfoil sections (i.e., leading edge or training edge), and on either side of the blade (i.e., pressure side or suction side). In addition to substantially high lift and drag reduction—thus high aerodynamic lift-to-drag ratios and efficiencies—these characteristics, in some cases, are varied by adjusting only the blade blowing rates or blowing pressures through the one or more slots. This may advantageously eliminate the need for blade twist; blade chord change or local planform area variation (taper); blade camber; and blade variable airfoil geometry, some or all of which, for traditional blades, may change all along the blade span to account for different local wind speeds and wind angles at the various blade radial locations.

Blades

In an aspect of the invention, a blade for use with a turbine, such as a wind turbine, comprises a pressure side and suction side meeting at a trailing edge and leading edge, the pressure side having a pressure side surface and the suction side having a suction side surface, the pressure side surface and suction side surface configured to provide aerodynamic or hydrodynamic lift ("lift") to the blade upon the flow of air from the leading edge to the trailing edge and over the pressure side and suction side surfaces. The pressure side and suction side extend from a root portion to a tip portion of the blade.

In some embodiments, the root/inboard portion of the blade is substantially non-aerodynamic. That is, with the blade freely positioned in the path of a flowing fluid (e.g., air), the root/inboard portion, in an embodiment, does not provide sufficient aerodynamic lift. The substantially non-aerodynamic root/inboard portion in some cases manifests a separated flow of a gas over the root/inboard portion of the blade. In view of flow separation, aerodynamic lift is reduced, if not eliminated. Thus, such a blade, when placed in the path of a flowing fluid, ordinarily does not generate aerodynamic lift that is sufficient to impart mechanical motion to a turbine. In some embodiments, the aerodynamic lift of the blade is improved (or augmented) with the aid of blown passages or orifices in the blade. That is, directing a fluid through one or more openings or orifices in the blade improves the aerodynamics of the otherwise non-aerodynamic blade portions. With these blown sections, the effective blade may extend to the root.

In some embodiments, the placement of one or more blown passages at a suction side of a blade at or near a root portion of the blade and one or more blown passages at a pressure or suction side of the blade at or near the tip portion of the blade provides sufficient aerodynamic control over a blade having a non-aerodynamic root portion. The combination of suction side and pressure side blown slots unexpectedly helps improve the aerodynamics of an otherwise non-aerodynamic blade while eliminating the need for a complex braking system, as is found in certain turbines. In some cases, for blades having aerodynamic root portions, such an arrangement of blown slots is redundant.

An example of achieving a non-aerodynamic root portion includes having a leading edge that is parallel to a trailing edge at a portion of the blade at or toward the root section of the blade, such as a portion of the blade from the root to a predetermined length from the root. At this portion of the blade there is no twisting of the surfaces of the blade. In some situations, such blade geometry is preferable from a manufacturing standpoint as a blade having such a non-aerodynamic root portion is relatively easier to manufacture. Any loss in aerodynamic efficiency is mitigated, if not eliminated, with the aid of blowing, as described herein. As such, while structural features of the root portion (or root section) of the blade make the root portion of the blade less aerodynamic or non-aerodynamic in relation to other blades (such as, e.g., blades with twists), blowing improves the aerodynamics of the root portion, thereby improving the effective aerodynamics of the blade.

In another embodiment, a blade configured to be used in a wind turbine comprises a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces, the pressure side and suction side at a root/inboard portion of the blade being substantially non-aerodynamic. The blade includes one or more airfoils located span-wise along the blade.

The blade further includes one or more openings at one of the pressure side and the suction side, the one or more openings for providing aerodynamic shaping to the blade. In some cases, the blade further comprises one or more openings at the other of the pressure side and the suction side, the one or more openings for providing aerodynamic shaping to the blade. The one or more openings at the suction side are disposed at or near a leading edge and/or trailing edge of the blade, or at a position between the leading and trailing edge. In an example, the blade includes an opening at the suction side adjacent the trailing edge of the blade. Additionally, if the blade has one or more openings at the pressure side, the one or more openings are disposed at or near a leading edge and/or trailing edge of the blade. In an example, the blade includes an opening at the pressure side adjacent a trailing edge of the blade.

Openings at the pressure side are disposed at a surface of the pressure side or disposed at the leading edge or trailing edge of the blade and oriented such that a pressurized fluid is provided to the pressure side of the blade. Similarly, openings at the suction side are disposed at a surface of the suction side or disposed at the leading edge, trailing edge, or between the leading edge and trailing edge of the blade and oriented such that a pressurized fluid is provided to the suction side of the blade.

In some embodiments, blown passages are oriented span-wise in relation to a blade. That is, a blown passage or a plurality of blown passages are oriented such that they run from a first point on the blade toward either a tip or root portion of the blade. In such cases, the blown passages are parallel to a leading and/or trailing edge of the blade, or angled with respect to the leading and/or trailing edge. In an example, a blown passage is an elongate slot running from a midpoint of the blade to a root of the blade.

In some situations, the blade includes a suction side opening (e.g., elongated slot, slit) at the suction side of the blade and oriented parallel to a trailing edge of the blade, and a pressure side opening (e.g., elongated slot, slit) at the pressure side and oriented parallel to the trailing edge of the blade. In other situations, the suction side and/or pressure side openings are not parallel to the leading edge and the trailing edge, respectively. For example, the suction side opening is oriented at an angle between about 5° and 50°, or an angle of at least about 5°, 10°, 15°, 20°, 25°, 30°, 35°, 40°, 45°, or 50° with respect to the trailing edge of the blade. As another example, the pressure side opening is oriented at an angle between about 5° and 50°, or an angle of at least about 5°, 10°, 15°, 20°, 25°, 30°, 35°, 40°, 45°, or 50° with respect to the trailing edge of the blade (see, e.g., FIGS. 5A and 5B). The suction side opening is disposed toward or in the vicinity of the root section of the blade. The pressure side opening is disposed toward or in the vicinity of the tip section of the blade. The suction side opening is for providing aerodynamic shaping to one or more airfoils toward the root section of the blade. The pressure side opening is for providing negative blade lift, increased drag and aerodynamic braking, such as near the blade tip. In some situations, pressure side blowing is precluded and aerodynamic control and braking is accomplished solely with the aid of suction side blowing.

In some situations, one or more openings are provided at a leading edge of the blade for minimizing, if not eliminating, leading-edge flow separation, laminar leading edge bubbles, and/or blade stall at high local angles of attack. In an embodiment, the one or more openings are disposed at a suction side of the blade. In another embodiment, the one or more openings are disposed at a pressure side of the blade. In some situations, if the one or more openings include slits, the slits are generally oriented parallel to the leading edge of the blade, though in other situations the slits are angled between about 5° and 50°, or at least about 5°, 10°, 15°, 20°, 25°, 30°, 35°, 40°, 45°, or 50° in relation to the trailing edge of the blade. These leading edge blowing slots may also provide control of the blade pitching moment.

In some embodiments, suction side and/or pressure side blowing is used to cause or effect flow separation. In an embodiment, blown slots or passages (e.g., slits) provide pressurized air (or other gas) to a suction side of a blade at an angle that is oriented at or between a vector normal to a surface of the suction side of the blade and a vector parallel (or tangential) to the surface of the suction side of the blade and oriented toward the leading edge of the blade. In an example, pressurized air is provided to the suction side at an angle that is between about 1° and 90°, 5° and 85°, or at least about 5°, 10°, 15°, 20°, 25°, 30°, 35°, 40°, 45°, 50°, 55°, 60°, 65°, 70°, 75°, 80°, or 85° with respect to a vector parallel to a surface of the suction side and oriented toward the leading edge—i.e., pressurized air is blown toward the leading edge.

Blades described in some embodiments of the invention, in comparison to the blades of FIGS. 1 and 2, are less aerodynamic. However, blown passages or orifices (that is, passages or openings to provide a pressurized fluid, such as pressurized air) provide virtual shaping to the blades that provide for an effective shape of each of the blades that is improved from an aerodynamics standpoint.

Blades provided herein have various advantages over certain current blades. In an example, blades provided herein are easier to manufacture and maintain, leading to decreased operating and maintenance costs. In addition, the application of pressurized air to improve the aerodynamics of such blades and enable braking precludes the need for mechanical components found in at least some turbines, such as, for example, braking systems.

Blades provided herein include at least one passage in fluid communication with one or more openings in the blade. The one or more openings have shapes selected from various geometric shapes, such as elongated or longitudinal (e.g., slits), circular, triangular, rectangular, pentagonal or hexagonal, or partial versions (e.g., semi-circular, semi-rectangular) of those geometric shapes. In some cases, the one or more openings are disposed at various locations of the blade, such as at the root portion, the tip portion and/or partial or full length slots at locations in-between the root and tip portions. The application of air (or other fluid) through the one or more openings provides virtual shaping to the blade, which in at least some cases improves the aerodynamics of the blade. The virtual shaping decreases the separation of flow over the suction side of the blade, leading to improved aerodynamic lift and hence mechanical motion that in some cases is used to generate power.

Figure 3:
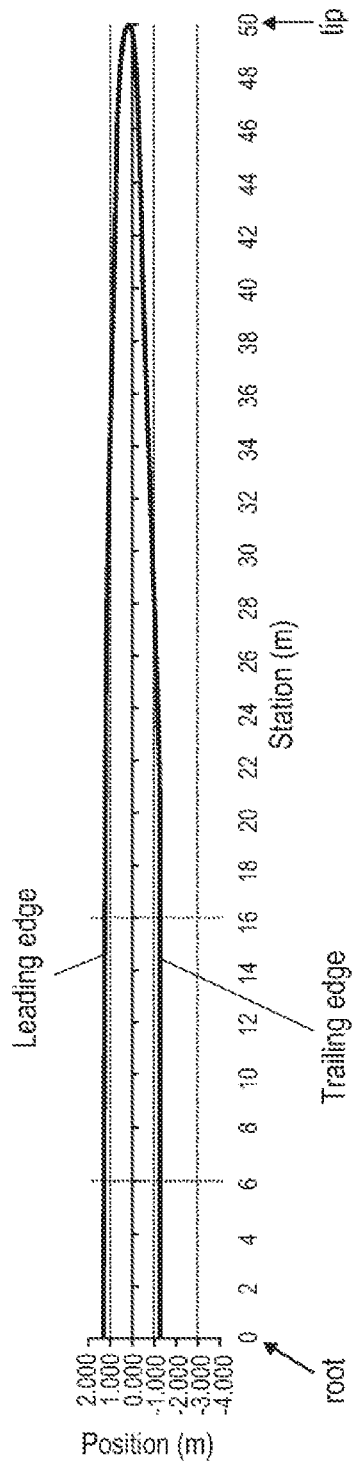
FIG. 3 illustrates a blade planform, in accordance with an embodiment of the invention.

In some embodiments, a blade has a constant chord from a root (also "root" herein) to a predetermined location along the span of the blade. FIG. 3 shows an example of a blade planform having a root chord that is reduced with respect to the chord of the blade of FIG. 2, in accordance with an embodiment of the invention. FIG. 3 is a top-down planform view of the blade. A leading edge of the blade is at the top of the figure, a trailing edge of the blade is at the bottom of the figure, a root of the blade is at 0 m along the horizontal axis ("Blade Station") and a tip portion (also "tip" herein) is at about 50 m along the horizontal axis. The vertical axis designates position along the chord of the blade. The chord of the blade at the root is about 2.4-2.6 m. The planform of FIG. 3 has a span of about 50 m. In some embodiments, a blade has other spans, such as a span of between about 0.5 m and 100 m, or between about 10 m and 60 m. In other cases, a blade has a span up to and including about 1 m, or 2 m, or 3 m, or 4 m, or 5 m, or 6 m, or 7 m, or 8 m, or 9 m, or 10 m, or 20 m, or 30 m, or 40 m, or 50 m, or 60 m, or 70 m, or 80 m, or 90 m, or 100 m, or 200 m, or 300 m, or 400 m, or 500 m.

The blade of FIG. 3 has a thickness-to-chord ratio (percentage) between about 10% and 80%, or between about 30% and 70%, or between about 55% and 60%. In an example, the thickness of the blade is about 20% of the chord of the blade. The chord of the blade is measured at any position along a horizontal axis having the span of the blade (i.e., an axis extending from a root of the blade to the tip of the blade). In some cases, the blade at the root section has a thickness-to-chord ratio of at least about 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%. In an embodiment, the blade has a constant thickness-to-chord ratio for a predetermined portion of the blade near the root of the blade.

A chord of the blade as measured from the root of the blade (Blade Station=0) to about 20 meters (m) or 21 m (or about 40% span) from the root is substantially constant. That is, from the root to about 20 m or 21 m (or about 40% span) from the root, the chord varies by at most about 5%. In other situations, from the root to about 20 m or 21 m from the root, the chord varies by at most about 5%, 4%, or 3%, or 2%, or 1%, or 0.5%, or 0.1%. In other cases, any predetermined portion of the blade, as measured from the root, has a substantially constant chord.

In some embodiments, a chord of a blade as measured from the root of the blade to about 1%, 5%, 10%, 15%, 20%, 25%, 30%, 35%, 40%, or 50% span, as measured from the root, is substantially constant. From the root to about 1%, 5%, 10%, 15%, 20%, 25%, 30%, 35%, 40%, or 50% span (as measured from the root), the chord varies by at most about 5%, 4%, or 3%, or 2%, or 1%, or 0.5%, or 0.1%. In other situations, any predetermined portion of the blade, as measured from the root, has a substantially constant chord.

In some cases, between about 20% and 60% of the leading edge of the blade, as measured from the root of the blade, is parallel to the trailing edge. In other cases, up to and including about 40% of the leading edge is parallel to the trailing edge. For instance, 20%, or 21%, or 22%, or 23%, or 24%, or 25% or 26%, or 27%, or 28%, or 29%, or 30%, or 31%, or 32%, or 33%, or 34%, or 35%, or 36%, or 37%, or 38%, or 39%, or 40% of the leading edge, as measured from the root of the blade, is parallel to the trailing edge.

In some situations, the chord of the blade toward a root of the blade varies by at most about 0.1%, or 0.5%, or 1%, or 2%, or 3%, or 4%, or 5%, or 6%, or 7%, or 8%, or 9%, or 10%. For instance, the chord of the blade of FIG. 3 toward the root of the blade varies by at most about 1%.

Figure 4:
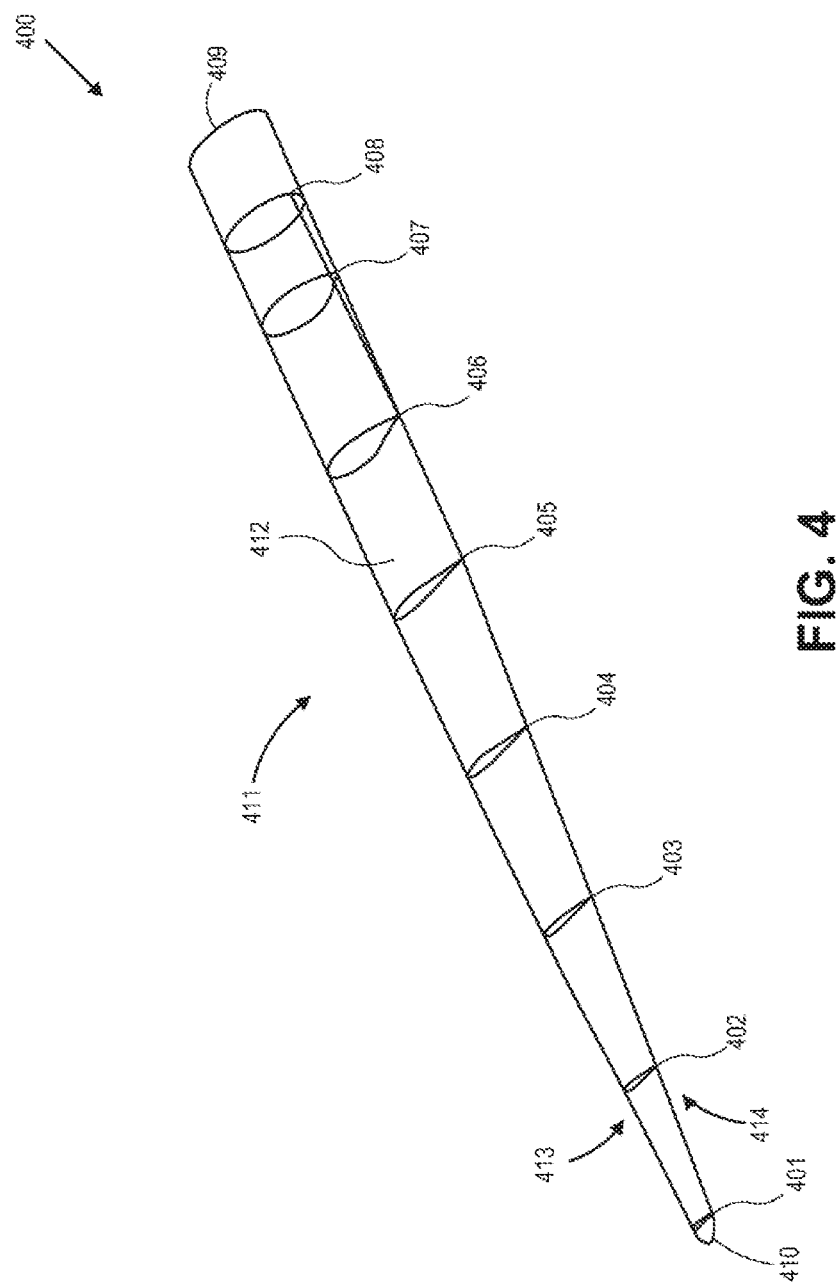
FIG. 4 schematically illustrates a blade having a plurality of airfoil sections, in accordance with an embodiment of the invention.

FIG. 4 shows a blade 400, in accordance with an embodiment of the invention. The blade 400 includes a plurality of airfoils 401, 402, 403, 404, 405, 406, 407 and 408 positioned between a root 409 and tip 410 of the blade. The blade 400 includes a suction side 411 having a suction side surface 412, and a pressure side having a pressure side surface, which are disposed opposite from the suction side 411 and suction side surface 412. The blade includes a leading edge 413 and trailing edge 414. The blade may include spar caps (not shown) that provide structural support to the blade 400. The blade 400 is mountable on a wind turbine. In an example, a wind turbine includes a plurality of blades similar or identical to the blade 400. In some situations, the wind turbine includes 2, or 3, or 4, or 5, or 6, or 7, or 8, or 9, or 10 blades.

In an example, the blade 400 includes two spar caps (also "sparcaps" herein), a first spar cap at the suction side surface 411 and a second spar cap at the pressure side surface. In other situations, the blade 400 includes 2 or more, or 3 or more, or 4 or more, or 5 or more, or 6 or more, or 8 or more, or 9 or more, or 10 or more, or 20 or more, or 30 or more, or 40 or more, or 50 or more spar caps. In other situations, the blade 400 is formed of a single-piece material without any spar caps.

In an embodiment, the blade 400 is formed of one or more materials selected from the group consisting of a polymeric material, a foam-type material, one or more metals and one or more non-metals. In an example, the blade 400 is formed of glass fiber material with a resin or carbon fiber material with a resin.

Figure 5A:
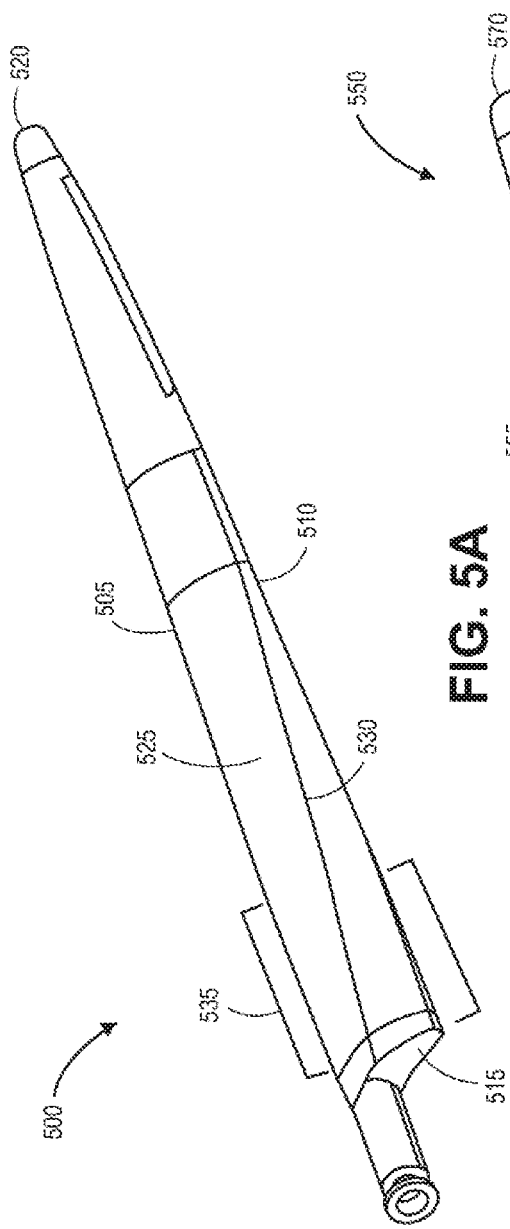
FIG. 5A schematically illustrates a blade, in accordance with an embodiment of the invention.

FIG. 5A schematically illustrates a blade 500, in accordance with an embodiment of the invention. The blade 500 includes a leading edge 505, trailing edge 510, root portion 515 and tip portion 520. A suction side 525 of the blade 500 opposes a pressure side (not shown) of the blade. The blade 500 includes an opening 530 configured to provide an exit for a fluid, such as air, over a suction side of the blade 500. The opening 530, as illustrated, is a slot extending from about a midpoint of the blade 500 toward the root 515. The leading edge 505 and trailing edge 510 at a span section (or portion) 535 of the blade 500, which is a portion of the blade 500 extending away from the root portion 515, are parallel to one another.

In some cases, the blade 500 includes one or more openings at a pressure side of the blade. In an embodiment, the one or more openings are disposed toward the tip 520 of the blade. In other cases, the opening 530 is disposed at the trailing edge 510 at or near the root 515. In some situations, the blade 500 includes one or more openings at the suction side 525 at or near the tip 520.

Figure 5B:
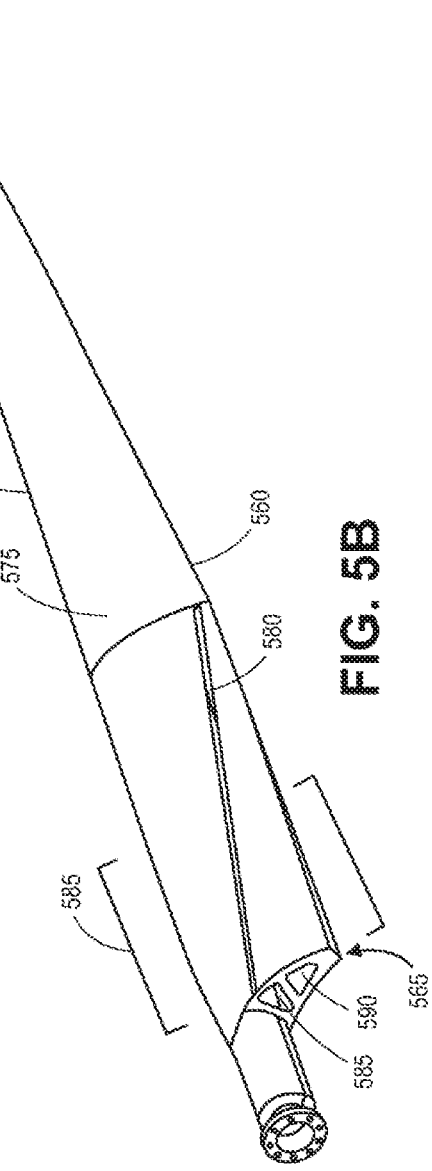
FIG. 5B schematically illustrates a blade, in accordance with an embodiment of the invention.

FIG. 5B shows a blade 550, in accordance with an embodiment of the invention. The blade 550 includes a leading edge 555, trailing edge 560, root portion 565 and tip portion 570. A suction side 575 of the blade 550 opposes a pressure side (not shown) of the blade. The blade 550 includes an opening 580 extending from about a midpoint of the blade 550 toward the root 565. The leading edge 555 and trailing edge 560 at a span section (or portion) 580 of the blade 550 are parallel to one another. The blade 550 also includes a plurality of openings 585 and 590 for directing air (or other fluid) to one or more openings of the blade 550 in fluid communication with the suction side 575 and/or pressure side of the blade 550, including the opening 580. In some situations, the opening 580 runs the length of one or more of the openings 585 and 590.

In some cases, the blade 550 includes one or more openings at a pressure side of the blade. In an embodiment, the one or more openings are disposed toward the tip 520 of the blade. In other cases, the opening 580 is disposed at the trailing edge 560 at or near the root 565. In some situations, the blade 550 includes one or more openings at the suction side 575 at or near the tip 570.

Figure 6:
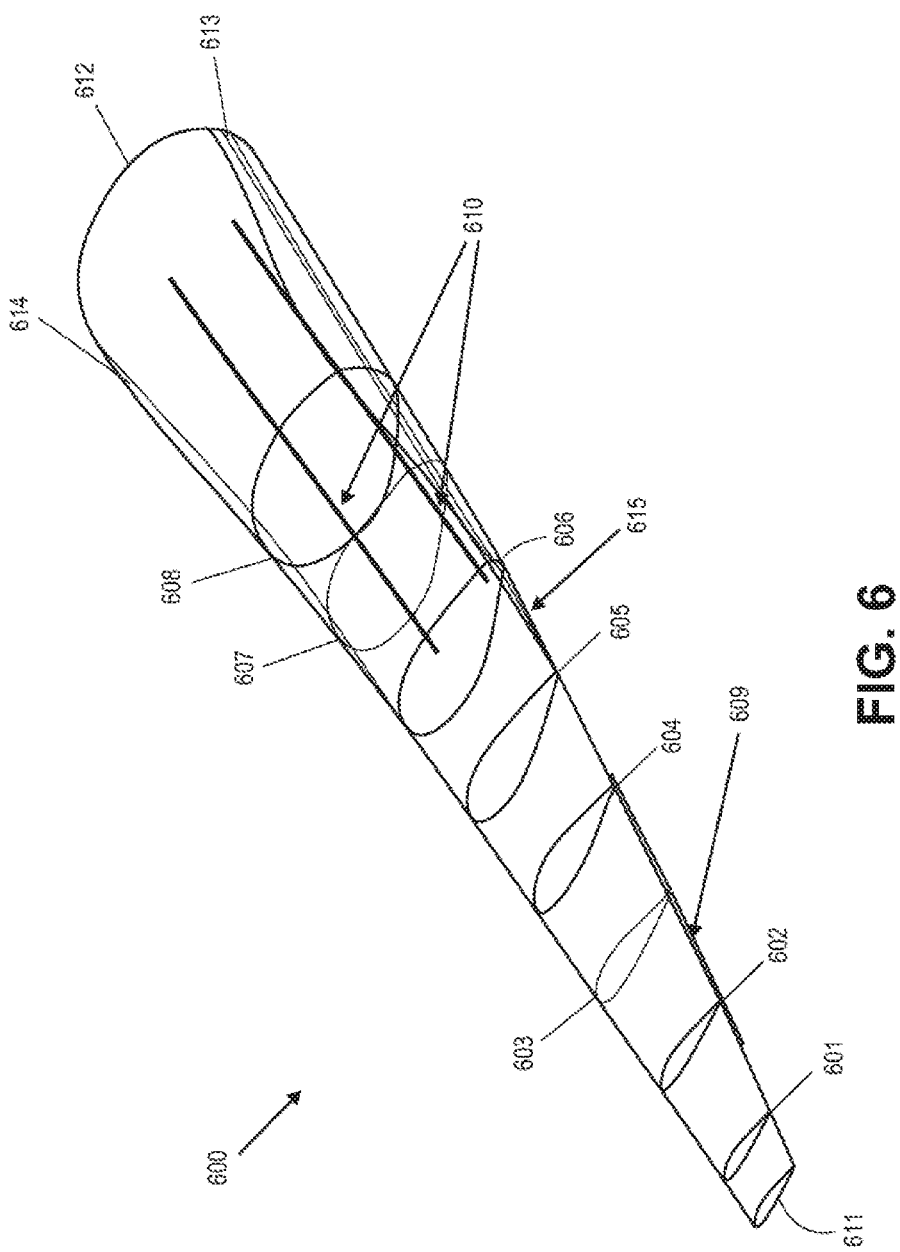
FIG. 6 schematically illustrates a blade having a plurality of blown passages, in accordance with an embodiment of the invention.

FIG. 6 schematically illustrates a blade 600, in accordance with an embodiment of the invention. In some situations, the blade 600 has features that are similar or identical to the blade 400 of FIG. 4. Blade 600 includes a plurality of airfoil sections 601, 602, 603, 604, 605, 606, 607 and 608 for providing structural support (or structural rigidity) to the blade 600.

In some cases the blade 600 is substantially non-aerodynamic. That is, upon the flow of a fluid from a leading edge to a trailing edge and over the suction and pressure sides of a blade shaped like the blade 600, the freestanding blade, by itself, is not configured to generate sufficient or optimal aerodynamic lift (e.g., lift necessary for generating power with the aid of a turbine). This is at least in part due to flow separation. However, the blade 600 includes one or more orifices for providing a fluid (e.g., pressurized air, which is also referred to as "blown air" herein) over the pressure side and/or the suction side of the blade, which mitigates, if not eliminates, flow separation. This in turn eliminates any separation that exists at the suction side of the blade. The blade 600 includes a pressure side blowing orifice 609 for directing a flowing fluid, such as blown air, to the pressure side of the blade. In addition, the blade 600 includes suction side blowing orifices 610 for directing a flowing fluid to the suction side of the blade.

The pressure side blowing orifice (also "blowing slot" herein) 609 is disposed in proximity to a tip 611 of the blade 600. The blowing orifices 610 are disposed in proximity to a root 612 of the blade 600. The slots 609 and 610 are oriented along a trailing edge 613 of the blade 600. The trailing edge 613 is opposite from a leading edge 614 of the blade 600.

The suction side blowing orifices 610 include a first blowing orifice disposed adjacent the trailing edge 613 and second blowing orifice disposed adjacent a center line of the blade 600.

In some situations, the blade 600 includes blowing orifices at or near the leading edge 614 of the blade 600 (i.e., "leading edge blowing orifices"). In an embodiment, the leading edge blowing orifices are oriented generally parallel to the leading edge of the blade 600. In another embodiment, the blade 600 includes blowing slots in a center line chord region at or near the tip 611 of the blade 600.

In some embodiments, the pressure side blowing orifice 609 are oriented such that a flowing fluid (e.g., blown air) is provided to the pressure side (not shown) of the blade 600 at an angle between about 0° and 180°, or 25° and 135°, or 35° and 125° with respect to the surface of the pressure side adjacent the pressure side blowing orifice 609. In some situations, blown air is provided through the pressure side blowing orifice 609 at an angle, with respect to an axis oriented from a centerline of the blade 600 toward the leading edge 614, of between about 0° and 90°, or 0° and 25° with respect to the surface of the pressure side. In an example, blown air is provided through the pressure side blowing orifice 609 at an angle, with respect to an axis oriented from a centerline of the blade 600 toward the leading edge 614, of about 0°, or 1°, or 2°, or 3°, or 4°, or 5°, or 6°, or 7°, or 8°, or 9°, or 10°, or 11°, or 12°, or 13°, or 14°, or 15°, or 16°, or 17°, or 18°, or 19°, or 20°, or 21°, or 22°, or 23°, or 24°, or 25°, or 26°, or 27°, or 28°, or 29°, or 30°, or 31°, or 32°, or 33°, or 34°, or 35°, or 36°, or 37°, or 38°, or 39°, or 40°, or 41°, or 42°, or 43°, or 44°, or 45°, or 46°, or 47°, or 48°, or 49°, or 50°, or 51°, or 52°, or 53°, or 54°, or 55°, or 56°, or 57°, or 58°, or 59°, or 60°, or 61°, or 62°, or 63°, or 64°, or 65°, or 66°, or 67°, or 68°, or 69°, or 70°, or 71°, or 72°, or 73°, or 74°, or 75°, or 76°, or 77°, or 78°, or 79°, or 80°, or 81°, or 82°, or 83°, or 84°, or 85°, or 86°, or 87°, or 88°, or 89°, or 90° with respect to the surface of the pressure side. In other situations, blown air is provided through the pressure side blowing orifice 609 at an angle, with respect to an axis oriented from a centerline of the blade 600 toward the trailing edge 613, of between about 0° and 90°, or 0° and 25° with respect to the surface of the pressure side. In an example, blown air is provided through the pressure side blowing orifice 609 at an angle, with respect to an axis oriented from a centerline of the blade 600 toward the trailing edge 613, of at least about 0°, or 1°, or 2°, or 3°, or 4°, or 5°, or 6°, or 7°, or 8°, or 9°, or 10°, or 11°, or 12°, or 13°, or 14°, or 15°, or 16°, or 17°, or 18°, or 19°, or 20°, or 21°, or 22°, or 23°, or 24°, or 25°, or 26°, or 27°, or 28°, or 29°, or 30°, or 31°, or 32°, or 33°, or 34°, or 35°, or 36°, or 37°, or 38°, or 39°, or 40°, or 41°, or 42°, or 43°, or 44°, or 45°, or 46°, or 47°, or 48°, or 49°, or 50°, or 51°, or 52°, or 53°, or 54°, or 55°, or 56°, or 57°, or 58°, or 59°, or 60°, or 61°, or 62°, or 63°, or 64°, or 65°, or 66°, or 67°, or 68°, or 69°, or 70°, or 71°, or 72°, or 73°, or 74°, or 75°, or 76°, or 77°, or 78°, or 79°, or 80°, or 81°, or 82°, or 83°, or 84°, or 85°, or 86°, or 87°, or 88°, or 89°, or 90° with respect to the surface of the pressure side. In another example, blown air is provided through the pressure side blowing orifice 609 at an angle of about 90° with respect to the surface of the pressure side.

The pressure side blowing orifice 609, as illustrated, is disposed at or near the trailing edge 613 of the blade 600. In other cases, however, the pressure side blowing orifice 609 is disposed along the pressure side and away from the trailing edge 613. In an example, the pressure side blowing orifice 609 is disposed midway along the pressure side of the blade 609, such as midway along a chord of the blade 600. Alternatively, the pressure side blowing orifice 609 is disposed at or near the leading edge 614 of the blade 600. In other situations, the blowing orifice 609 is on the pressure side and at or between the leading edge 614 and the trailing edge 613. In other cases, a pressure side blowing orifice is disposed at the trailing edge 613 and at a location on the pressure side of the blade 600.

With continued reference to FIG. 6, in some cases the suction side blowing orifices 610 are oriented to provide a flowing fluid tangentially with respect to a surface of the suction side. Alternatively, the suction side blowing orifices 610 are oriented such that a flowing fluid, such as blown air, is provided at an angle between about 0° and 90°, or between about 25° and 75°, or between about 35° and 55° with respect to the surface of the suction side adjacent the suction side blowing orifices 610 and in relation to the trailing edge. In an embodiment, blown air is provided parallel to the suction side in a downstream direction (i.e., along the direction of the flow of air from the leading edge to the trailing edge), or perpendicular to a surface of the suction side. In some situations, blown air is provided at an angle between about 40° and 45° with respect to the surface of the suction side, as measured from an axis oriented toward the trailing edge.

In some embodiments, the suction side blowing orifice 610 are oriented such that a flowing fluid (e.g., blown air) is provided to the suction side of the blade 600 at an angle between about 0° and 180°, or 25° and 135°, or 35° and 125° with respect to the surface of the suction side adjacent the suction side blowing orifice 610. In some situations, blown air is provided through the suction side blowing orifices 610 at an angle, with respect to an axis oriented from a centerline of the blade 600 toward the leading edge 614, between about 0° and 90°, or 0° and 25° with respect to the surface of the suction side. In an example, blown air is provided through the suction side blowing orifices 610 at an angle, with respect to an axis oriented from the centerline of the blade 600 toward the leading edge 614, of about 0°, or 1°, or 2°, or 3°, or 4°, or 5°, or 6°, or 7°, or 8°, or 9°, or 10°, or 11°, or 12°, or 13°, or 14°, or 15°, or 16°, or 17°, or 18°, or 19°, or 20°, or 21°, or 22°, or 23°, or 24°, or 25°, or 26°, or 27°, or 28°, or 29°, or 30°, or 31°, or 32°, or 33°, or 34°, or 35°, or 36°, or 37°, or 38°, or 39°, or 40°, or 41°, or 42°, or 43°, or 44°, or 45°, or 46°, or 47°, or 48°, or 49°, or 50°, or 51°, or 52°, or 53°, or 54°, or 55°, or 56°, or 57°, or 58°, or 59°, or 60°, or 61°, or 62°, or 63°, or 64°, or 65°, on 66°, or 67°, or 68°, or 69°, or 70°, or 71°, or 72°, or 73°, or 74°, or 75°, or 76°, or 77°, or 78°, or 79°, or 80°, or 81°, or 82°, or 83°, or 84°, or 85°, or 86°, or 87°, or 88°, or 89°, or 90° with respect to the surface of the suction side. In other situations, blown air is provided through the suction side blowing orifices 610 at an angle, with respect to an axis oriented from a centerline of the blade 600 toward the trailing edge 613, between about 0° and 90°, or 0° and 25° with respect to the surface of the suction side. In an example, blown air is provided through the suction side blowing orifices 610 at an angle, with respect to an axis oriented from the centerline of the blade 600 toward the trailing edge 613, of about 0°, or 1°, or 2°, or 3°, or 4°, or 5°, or 6°, or 7°, or 8°, or 9°, or 10°, or 11°, or 12°, or 13°, or 14°, or 15°, or 16°, or 17°, or 18°, or 19°, or 20°, or 21°, or 22°, or 23°, or 24°, or 25°, or 26°, or 27°, or 28°, or 29°, or 30°, or 31°, or 32°, or 33°, or 34°, or 35°, or 36°, or 37°, or 38°, or 39°, or 40°, or 41°, or 42°, or 43°, or 44°, or 45°, or 46°, or 47°, or 48°, or 49°, or 50°, or 51°, or 52°, or 53°, or 54°, or 55°, or 56°, or 57°, or 58°, or 59°, or 60°, or 61°, or 62°, or 63°, or 64°, or 65°, or 66°, or 67°, or 68°, or 69°, or 70°, or 71°, or 72°, or 73°, or 74°, or 75°, or 76°, or 77°, or 78°, or 79°, or 80°, or 81°, or 82°, or 83°, or 84°, or 85°, or 86°, or 87°, or 88°, or 89°, or 90° with respect to the surface of the suction side.

The suction side blowing orifices 610 are disposed along the suction side of the blade 600. Further, the suction side blowing orifices 610 are disposed at or near the trailing edge of the blade 600. In other situations, the suction side blowing orifices 610 are disposed at or near the leading edge of the blade 600. In some cases, a suction side blowing orifice is disposed at or near the trailing edge of the blade 600 and another suction side blowing orifice is disposed at some location along a chord of the blade 600, such as midway along the chord.

In some embodiments, the blade 600 includes 1 or more, or 2 or more, or 3 or more, or 4 or more, or 5 or more, or 6 or more, or 7 or more, or 8 or more, or 9 or more, or 10 or more, or or more, or 30 or more, or 40 or more, or 50 or more suction side blowing orifices 610. In other embodiments, the blade 600 includes 1 or more, or 2 or more, or 3 or more, or 4 or more, or 5 or more, or 6 or more, or 7 or more, or 8 or more, or 9 or more, or 10 or more, or 20 or more, or 30 or more, or 40 or more, or 50 or more pressure side blowing orifices 609. Pressure side blowing orifices 609 are used in conjunction with, or in place of, suction side blowing orifices 610.

As illustrated, the blade 600 includes three suction side orifices (with one suction side orifice at the leading edge) and one pressure side orifice. However, in other cases the blade includes any number of pressure side and suction side orifices. In some embodiments, the pressure side includes 1 or more, or 2 or more or 3 or more or 4 or more or 5 or more or 10 or more or 20 or more or 50 or more orifices, and the suction side includes 1 or more, or 2 or more or 3 or more or 4 or more or 5 or more or 10 or more or 20 or more or 50 or more orifices. In some situations, the blade 600 includes pressure side orifices or suction side orifices, but not both. In an example, the blade 600 includes three pressure side orifices and two suction side orifices. In another example, the blade includes two pressure side orifices and one suction side orifice. In some cases, the orifices are slots or slits, such as elongated openings (e.g., elongate elliptical or rectangular openings). Alternatively, the orifices are shaped circular, oval, triangular, square, rectangular, pentagonal, or hexagonal or partial shapes.

The pressure side orifice 609 is disposed toward the tip 611 of the blade 600. The suction side orifices 610 are disposed toward the root 612 of the blade 600. The pressure side orifice 609 is disposed beyond the midpoint 615 of the span of the blade 600. The suction side orifices 610 are disposed between the root portion 612 and the midpoint 615 of the blade 600.

The pressure side orifice 609 and suction side orifices 610 are slits or longitudinal openings in which one dimension of each of the openings is longer than another dimension. In some cases, the span is always larger than the height of each of the openings. Alternatively, each of the orifices is circular, triangular, square, rectangular, pentagonal, hexagonal, heptagonal, octagonal, nonagonal, or decagonal or partial shapes. In addition, in some cases the orifices are sized so as to provide a predetermined flow of blown air (or other fluid) over the pressure and/or suction side. In an embodiment, blown air is provided at a pressure between about 0.0001 atmospheres (atm) and 10 atm, or about 0.01 atm and 1 atm. In another embodiment, blown air is provided at a flow rate between about 0.01 m$^3$/s and 10,000 m$^3$/s, or between about 0.1 m³/s and 100 m³/s. In another embodiment, blown air is provided at a temperature between about −50° C. and 150° C., or 0° C. and 120° C.

The pressure side orifice 609 extends along the trailing edge 613 of the blade 600. The suction side orifices 610 extend along a surface of the blade 600 generally parallel to the trailing edge 613.

In some embodiments, the blade 600 includes one or more orifices at or adjacent the leading edge 614 (i.e., "leading edge orifices"). The leading edge orifices are oriented generally parallel to the leading edge 614. In some cases, the leading edge orifices are used in conjunction with, or in place of, the trailing edge orifices described above.

In some embodiments, leading edge blowing decreases flow separation at the suction side of the blade. In such a case, shutting off leading edge blowing may cause flow separation and blade stalling at high local angles of attack, which may provide a braking feature for a turbine having the blade 600.

In some embodiments, the blade 600 includes both leading edge blowing and trailing edge blowing. In such a case, when leading edge blowing is stopped and trailing edge blowing is continued or increased, leading edge flow separation and drag will be increased, leading to increasing (or greater) aerodynamic braking.

In some cases, leading edge and trailing edge blowing are employed concurrently for blade pitching moment minimization. In situations in which trailing edge blowing is increased, leading edge blowing is used to adjust the pitch and keep the pitching moment low, if not zero. In an embodiment, variable blowing at the trailing edge 613 and leading edge 614 is employed to alter the drag coefficient of the blade 600 to a negative value around the rotor azimuth during rotation by increasing slot thrust recovery and thus increasing rotor torque for higher blade efficiency. In some embodiments, variable blowing provides for a negative or positive drag coefficient ($C_d$), a positive or negative lift coefficient ($C_l$), and a positive or negative pitching moment coefficient ($C_m$). In an example, variable blowing provides for a drag coefficient ($C_d$) between about 0.01 and 0.4, or 0.15 and 0.2; a lift coefficient ($C_l$) between about −0.5 and 0.5, or −0.3 and 0.3; and a pitching moment coefficient ($C_m$) between about −0.1 and 0, or −0.09 and −0.04. In some situations, $C_l$ and $C_d$ are inversely, proportional to one another (i.e., as $C_l$ gets smaller, $C_d$ gets bigger, and vice versa).

In some embodiments, inboard (or root) blade section blowing improves the aerodynamics of inboard blade sections (near the root 612) which is otherwise non-aerodynamic or shows poor aerodynamic performance due, for example, to flow separation at local velocities. In some situations, blowing at the inboard blade section transfers more of the aerodynamic load on the blades inboard, thus unloading the outboard blade sections and reducing root bending moments on the blade structure. In some situations, this advantageously precludes the need for structurally rigid materials, which may make the blades lighter.

In some embodiments, the blade 600 includes one or more cavities that are in fluid communication with a fluid control system for providing a fluid, such as a gas (e.g., air), to the one or more cavities. The one or more cavities are in fluid communication with the pressure side orifice 609 and the suction side orifices 610. In an embodiment, the blade 600 is hollow. In another embodiment, the one or more cavities are defined by one or more partitions in the hollow blade 600.

In some embodiments, the blade 600 includes a cavity (not shown) that traverses a length of the blade 600. In an embodiment, the cavity traverses up to about 5%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 100% of the span of the blade 600 as measured from the root 612. In some situations, the cavity traverses a span of the blade, from root 612 to the tip 611. The cavity has a first end toward the root 612 and a second end toward the tip 611 of the blade 600.

In some embodiments, the orifice 609 is in fluid communication with the cavity along its entire length such that air or other pressurized fluid flows within the cavity from the first end toward the second end and out of the entire length of the orifice 609. In other embodiments, the orifice 609 is blocked. In such a case, in an embodiment, air is pumped into the cavity such that a pressure is built up within the cavity. The orifice is then opened to permit air to flow out of the orifice 609. The air flowing out of the orifice 609 is then directed toward the trailing edge 613 of the blade 600 along the surface of the blade 600. However, the air flowing out of the orifice 609 is not limited to being directed along the surface of the blade 600 toward the trailing edge 613; in some cases, air is directed out of the orifice 609 in nearly any direction to provide virtual shaping for the blade 600, when desired.

In some situations, the orifices 610 are in fluid communication with the cavity described above or another cavity for providing air to the orifices 610. In some situations, the orifices 610 are in fluid communication with the cavity that is also in fluid communication with the orifice 609. In such fashion, a fluid in the cavity is directed through the orifices 609 and 610 concurrently, or the orifices 609 and 610 are independently opened and closed to provide the fluid out of the orifices independently. For instance, in some cases it is desirable to provide a pressurized fluid out of orifice 609 but not the orifices 610. Alternatively, the orifices 610 are in fluid communication with a different cavity from that described above, which enables separate or independent control of fluid flow out of the orifices 609 and 610.

In an embodiment, the flow of air out of the orifice 609 is synchronized (e.g., overlapping blowing profiles) with the flow of air out of the orifices 610. In another embodiment, the flow of air out of the orifice 609 is asynchronous (e.g., non-overlapping blowing profiles) with respect to the flow of air out of the orifices 610.

The orifices 609 and 610 are in fluid communication with a fluid control system (see below) for providing a fluid, such as a pressurized fluid (e.g., pressurized air) out of the orifices 609 and 610. In some situations, a pressurized fluid is provided through the orifice 609 and the orifices 610 in an independent fashion. In an embodiment, this enables virtual shaping for improving the aerodynamics of the blade and a braking feature for slowing or stopping the rotation of a turbine having the blade 600. In other situations, a pressurized fluid is provided through the orifices 609 and 610 simultaneously.

In some embodiments, leading edge and/or trailing edge blowing provide for adjustment of an aerodynamic shape and/or pitch of a blade having such leading edge and/or trailing edge blowing. In some embodiments, with the aid of leading edge and/or trailing edge blowing, the power output of a turbine operatively coupled to the blade is improved by at least about 5%, or at least about 10%, or at least about 15%, or at least about 20%, or at least about 25%, or at least about 30%, or at least about 35%, or at least about 40%, or at least about 45%, or at least about 50%, or at least about 55%, or at least about 60%, or at least about 65%, or at least about 70%, or at least about 75%, or at least about 85%, or at least about 85%, or at least about 90%, or at least about 95%.

In some embodiments, a blade includes one or more orifices or passages for providing blowing at one or more of a pressure side of the blade, suction side of the blade, the trailing edge of the blade and the leading edge of the blade. Blowing at the trailing edge or leading edge of the blade includes directing a fluid at a location above the pressure side or suction side of the blade, or at a location in-between the pressure side and suction side at one or both of the leading edge and the trailing edge of the blade.

In some embodiments, blown slots are provided to direct a pressurized fluid at the trailing edge and in the direction of the pressure side of the blade and at an angle between about 0° and 180° with respect to a surface of the pressure side adjacent the trailing edge. In some cases, blown slots are provided to direct a pressurized fluid at the trailing edge and in the direction of the suction side of the blade and at an angle between about 0° and 180° with respect to a surface of the suction side adjacent the trailing edge. In an embodiment, suction side blowing is provided at or adjacent the root of the blade and pressure side blowing is provided at or adjacent the tip of the blade.

Figure 7:
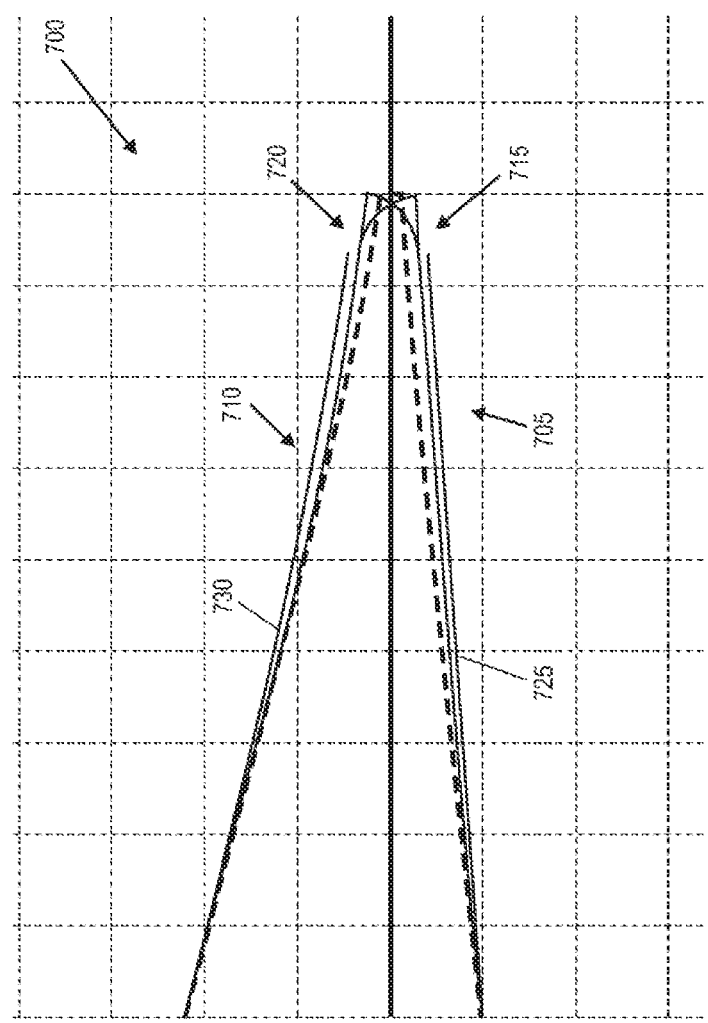
FIG. 7 schematically illustrates a blade airfoil section having a plurality of potential airfoils and a plurality of blowing slots, in accordance with an embodiment of the invention.

FIG. 7 shows an aft blade section 700 (such as the blade 600 of FIG. 6) having a plurality of airfoils, in accordance with an embodiment of the invention. The blade section 700 includes a pressure side 705, suction side 710, pressure side slot 715 and suction side slot 720. The pressure side 705 includes a pressure side surface 725 and the suction side 710 includes a suction side surface 730. The slots are for providing a fluid, such as a blown gas (e.g., air) or a pressurized fluid, to the pressure side 705 and suction side 710. The slots are disposed adjacent a trailing edge of the blade 700. In some situations, the slots are disposed at a trailing edge of the blade 700. In other situations, one or more of the slots are disposed at a predetermined distance from the trailing edge of the blade, such as between about 0.01 m and 5 m from the trailing edge.

In some situations, the blade 700 includes one or more slots at the suction side 710 of the blade 700, the one or more slots midway down the chord of the blade and toward the root of the blade. In such a case, the one or more slots are disposed between the root of the blade 700 and a mid-point of the span (i.e., 50% of the span of the blade as measured from either the root or tip portion). In some cases, the blade 700 includes one or more slots at the pressure side 705 of the blade 700, the one or more slots disposed midway along the chord of the blade 700 and toward the tip of the blade 700. In such a case, the one or more slots are disposed between the tip of the blade 700 and the mid-point of the span. In some embodiments, with the root position designated by 'R' (e.g., root 612 of FIG. 6), the tip position designated by 'T' (e.g., tip 611 of FIG. 6) and the mid-point of the span designated by 'M' (e.g., midpoint 615 of FIG. 6) (all positions taken along an axis having a span of the blade 700), the suction side slots are disposed at (M–R) multiples of about 0.1, or 0.2, or 0.3, or 0.4, or 0.5, or 0.6, or 0.7, or 0.8, or 0.9, or 1.0 in relation to R', and the pressure side slots are disposed at (T–M) multiples of about 0.1, or 0.2, or 0.3, or 0.4, or 0.5, or 0.6, or 0.7, or 0.8, or 0.9, or 1.0 in relation to 'T'. In other embodiments, the suction side and/or pressure side slots are disposed at (T–R) multiples of about 0.1, or 0.2, or 0.3, or 0.4, or 0.5, or 0.6, or 0.7, or 0.8, or 0.9, or 1.0 in relation to 'T' (i.e., as measured from the tip). In other embodiments, the suction side and/or pressure side slots are disposed at (T–R) multiples of about 0.1, or 0.2, or 0.3, or 0.4, or 0.5, or 0.6, or 0.7, or 0.8, or 0.9, or 1.0 in relation to 'R' (i.e., as measured from the root).

In some embodiments, the pressure side slot 715 is disposed in an airfoil toward a tip (or outboard) portion of the blade 700 and the suction side slot 720 is disposed toward the inboard (or root) portion of the blade 700. In an embodiment, this permits for virtual or aerodynamic shaping of the blade 700 (including individual airfoils of the blade 700) during operation of a turbine or other mechanical device having the blade 700. The blown slots 715 and 720 in some cases are configured to provide a fluid to minimize or eliminate flow separation, provide flow separation (e.g., to effect braking) and/or increase or decrease flow circulation during use of the blade.

With continued reference to FIG. 7, a portion of the trailing edge adjacent the pressure side slot 715 angles away from the pressure side 705 toward the suction side 710, and a portion of the trailing edge adjacent the suction side slot 720 angles away from the suction side 710 toward the pressure side 705. In some cases, a portion of the trailing edge adjacent the root portion has a curvature between about 0° and 180°, and a portion of the trailing edge adjacent the tip portion has a curvature between about 0° and 180°. In some embodiments, the trailing edge is round, cylindrically round, or elliptical, or includes an arch, curve, arc, or spiral. The tangentially-exiting blowing jet will in at least some cases adhere to these curved surfaces. This aerodynamically turns the flow and augments the aerodynamic forces and moments acting on the blade.

In some situations, airfoil surfaces downstream of the trailing edge blowing slots are curved or arced on either or both of the suction side and the pressure side. The tangential jets from the blowing slots may remain attached to these surfaces of the suction side and the pressure side and increase or decrease the aerodynamic lift, drag, and/or pitching moment, as desired.

The blown slots 715 and 720 are in fluid communication with one or more passageways (or conduits) for directing a fluid to the slots 715 and 720. In some cases, the slots 715 and 720 are in fluid communication with a chamber (or cavity) in the blade 700 that is in fluid communication with a fluid control system for providing a pressurized fluid to the slots 715 and 720.

In some embodiments, blowing on the suction side 710 (also "suction side blowing" herein) has the effect of increasing lift of an airfoil and, consequently, the blade 700, while blowing on the pressure side has the effect of reducing lift of the airfoil. In an embodiment, pressure side blowing—i.e., providing a fluid, such as pressurized air, to the pressure side 705 of the blade 700—is used to provide a braking feature to the blade 700, which in some situations precludes the need for an additional braking system, thus leading to considerable savings in system and maintenance costs.

In some embodiments, pressure side blowing is used to achieve a control surface that is actuated almost entirely by blowing, and in some cases entirely by blowing. Such a control surface is blown to reduce the lift and in association with suction side blowing functions as a control system for the blade. In some embodiments, the control surface (or control section) includes between about 5% and 40%, or between about 10% and 30%, or between about 15% and 20% of the span of the blade that is centered around the 80% span portion of the blade—i.e., 80% of the span of the blade as measured from the root of the blade.

Figure 8:
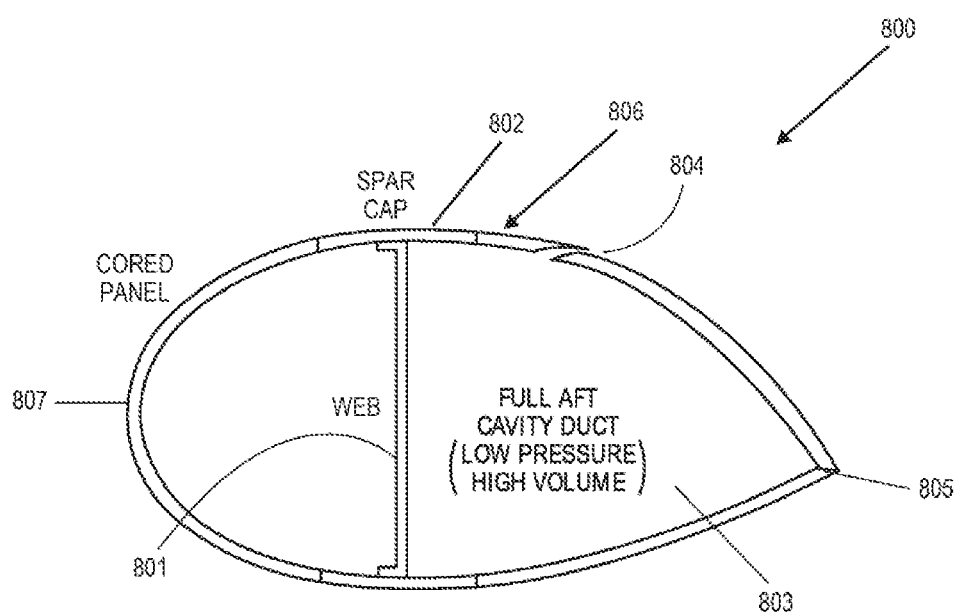
FIG. 8 schematically illustrates a slotted and blown blade section configured for use with a wind turbine.

FIG. 8 shows an airfoil 800 of a blown blade configured for use with a wind turbine, in accordance with an embodiment of the invention. The airfoil includes a web 801 and spar cap 802 for providing structural support to the airfoil. The airfoil includes a cavity 803 in fluid communication with an orifice or slot 804 configured to direct air (or other fluid) to a trailing edge 805 at a suction side 806 of the airfoil 800. The orifice 804 is in fluid communication with the suction side 806.

In some situations, the orifice 804 is a slot that runs along at least a portion of a span of the blade having the airfoil 800. The orifice 804 is disposed further toward a leading edge 807 of the airfoil 800 to reduce or eliminate flow separation due to thick-sectioned airfoils with low relative twist to the incoming flow.

In some embodiments, a blade having the airfoil 800 includes an airfoil (not shown) having an orifice at a pressure side of the airfoil. In such a case, the orifice is configured to provide pressurized air to the pressure side of the airfoil and toward the trailing edge of the airfoil.

With continued reference to FIG. 8, in some embodiments, the airfoil 800 has a blade life coefficient ($C_l$) between about 1 and 6 and equivalent lift-to-drag ratio (L/Deq), or between about 1 and 200 L/Deq. In an embodiment, $C_l$ is independent of the blade angle of attack. In some situations, with $C_\mu$ being the blowing coefficient, $\Delta C_l / C_\mu$ is greater than 1, or greater than 50, or greater than 100.

In some embodiments, the airfoil 800 includes a plurality of cavities in fluid communication with one or more orifices of the blade having the airfoil 800. In an embodiment, the cavities are fluid chambers in fluid communication with an air control system for regulating the flow of air (or other fluid) to the fluid chambers and the orifices. In an embodiment, the air control system includes one or more pumps and valves (e.g., throttle valve). In other embodiments, the airfoil 800 does not have any cavities. In such a case, in an embodiment, the orifice 803 is in fluid communication with the air control system via one or more fluid passages disposed within the blade having the airfoil.

Turbines

In another aspect of the invention, a system for generating power from wind comprises a blade having a pressure side and suction side meeting at a trailing edge and leading edge, the pressure side having a pressure side surface and the suction side having a suction side surface, the pressure side surface and suction side surface for providing lift to the airfoil upon the flow of air from the leading edge to the trailing edge and over the pressure side and suction side surfaces, the blade having a substantially non-aerodynamic root portion. The system further includes a control system for providing aerodynamic shaping to the airfoil of the wind turbine.

In some embodiments, the non-aerodynamic or less-aerodynamic root/inboard portion, which operates in a region of ineffective aerodynamic flow as flow separation or stalled flow (see above), has a shape for providing a separated flow of air (or other fluid) over the blade, including one or more airfoils of the blade. The separated flow is a highly separated flow of air (or other fluid). In such a case, the aerodynamic shaping provided by the control system decreases the separation of the flow of air over the blade. In some situations, this improves the aerodynamic lift of the blade. When the flow is caused to re-attach on the blown airfoil sections, lift coefficients of at least 1, or at least 5, or at least 10, or at least 15, or at least 20 are provided. In an example, a lift coefficient of about 14.0 is provided.

Figure 9:
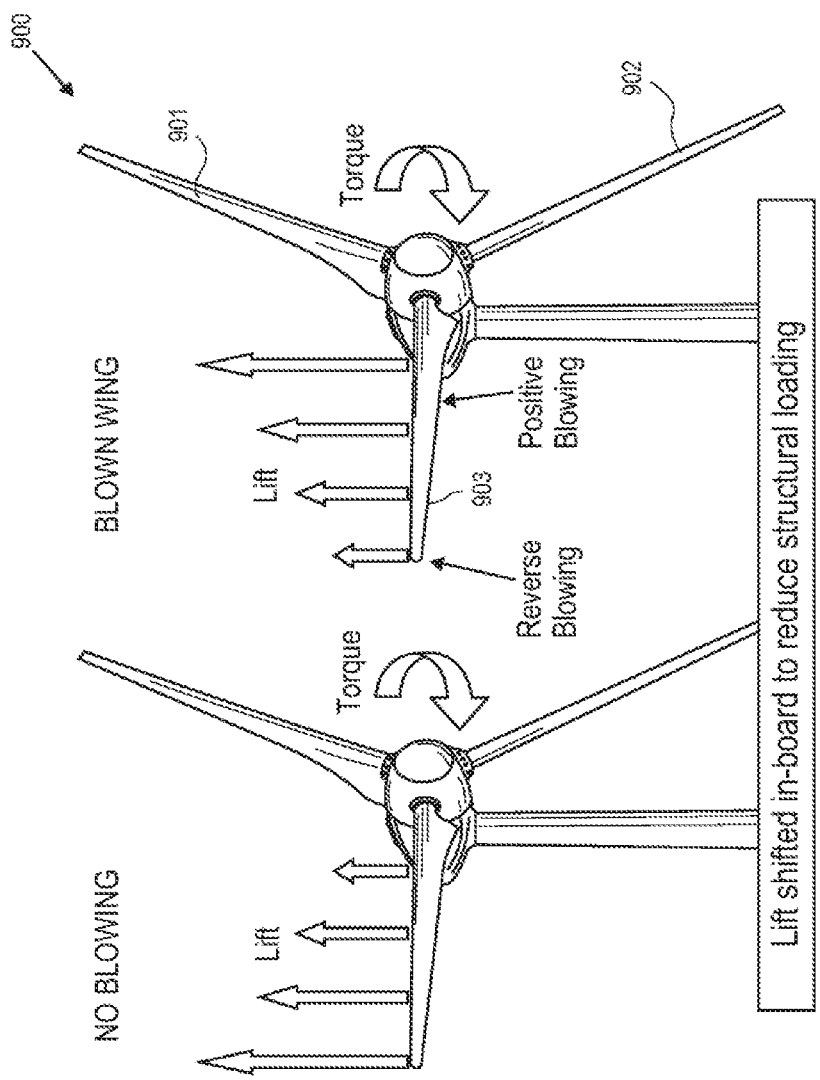
FIG. 9 schematically illustrates a wind turbine having a plurality of blades, with and without blowing slots, in accordance with an embodiment of the invention.

FIG. 9 shows a wind turbine 900 having a first blade 901, second blade 902 and third blade 903, each blade having one or more orifices (see above) for providing a pressurized fluid to openings or orifices (also "blown orifices" herein) at the pressure side and suction side of the blade, in accordance with an embodiment of the invention. The pressurized fluid in some cases provides aerodynamic shaping to the blades 901, 902 and 903 during use, which minimizes drag. In addition, in some situations the pressurized fluid increases drag to provide a braking function, which reduces or eliminates the rotation of the blades 901, 902 and 903 about a central axis of the wind turbine 900. In some situations, loading is shifted around each blade with the aid of a control system for providing a fluid to the one or more orifices in the blades. In some cases, the load(s) in the outboard section of each blade is reduced in higher wind situations.

With continued reference to FIG. 9, each of the blades 901, 902 and 903 has a non-aerodynamic or less-aerodynamic (see above) root portion. Without the application of pressurized air (or other fluid) through the blown orifices (also "blowing" herein), an individual blade of the blades 901, 902 and 903 experiences greater lift at an outboard (or tip) portion of the blade (see FIG. 9, left). For example, without blowing, the lift profile for blade 903 is such that the lift is at a maximum at the tip of the blade and progressively decreases with increasing distance from the tip of the blade 903 to the root of the blade 903. The application of pressurized air through the blown orifices, however, provides virtual shaping to the blades 901, 902 and 903 that improves the aerodynamic lift at the inboard (or root) portion of each of the blades 901, 902 and 903 (see FIG. 9, right). For example, with blowing, the lift profile for blade 903 is such that the lift is increased adjacent the root of the blade 903 and progressively decreases with increasing distance from the root of the blade 903 to the tip of the blade 903. Further, with the aid of blowing, lift along each blade is shifted in-board (or toward the root portion of each blade) to reduce structural loading.

In some embodiments, a wind turbine comprises a blade having one or more airfoils, the blade having a pressure side and suction side meeting at a trailing edge and leading edge, the pressure side having a pressure side surface and the suction side having a suction side surface, the pressure side surface and suction side surface for providing lift to the airfoil upon the flow of air from the leading edge to the trailing edge and over the pressure side and suction side surfaces. The wind turbine further comprises a pneumatic control system in fluid communication with the blade for adjusting a virtual pitch of the one or more airfoils of the blade. In an embodiment, the pneumatic control system is in fluid communication with one or more other blades of the wind turbine.

In an embodiment, the pneumatic control system is configured to adjust the lift of the blade by providing a pressurized fluid, such as pressurized air, to one or more openings in the blade (see above). In some cases, the pneumatic control system is configured to adjust the lift at an airfoil at a root section of the blade.

In some embodiments, a turbine comprises a power generator and a rotor operatively coupled to the power generator. The power generator is configured to generate electricity upon rotation of the rotor. In an implementation, the power generator is an induction generator and power is generated upon the rotation of a rotor of the power generator. The turbine further includes a plurality of blades extending radially outward from the root, each individual blade of the plurality of blades comprising a pressure side and suction side meeting at a trailing edge and leading edge, the pressure side having a pressure side surface and the suction side having a suction side surface, the pressure side surface and suction side surface for providing lift or negative lift, drag or negative drag, and positive or negative pitching moment to said individual blade upon the flow of air from the leading edge to the trailing edge and over the pressure side and suction side surfaces. At least one of the plurality of blades includes a first opening on the pressure side surface, the first opening to provide pressurized air to the pressure side, and/or a second opening on the suction side surface, the second opening to provide pressurized air to the suction side.

In some embodiments, the turbine includes two blades, three blades, four blades five blades, six blades, seven blades, eight blades, nine blades, ten blades, twenty blades, or more blades. In an embodiment, the turbine is a horizontal axis turbine, in which the rotor and power generator are arranged horizontally (i.e., oriented orthogonal to the gravitational acceleration vector), or vertical axis turbine, in which the rotor and power generator are arranged vertically (i.e., oriented along the gravitational acceleration vector).

At least one of the plurality of blades has a substantially non-aerodynamic or less—aerodynamic (see above) root portion. In some situations, the first and second openings are disposed at or adjacent the trailing edge of the at least one of the plurality of blades.

In some embodiments, the turbine is a wind turbine configured to generate power upon the flow of air over the plurality of blades. In other embodiments, the turbine is configured to generate power upon the flow of a moving liquid over the plurality of blades.

The turbine further includes a fluid control system in fluid communication with the first and second openings. The fluid control system is configured to independently provide a pressurized fluid to the first and second openings. In some cases, the flow rate of the pressurized fluid to each of the first and second openings is independently selected to control the aerodynamic lift of the at least one of the plurality of blades.

For instance, to improve the aerodynamics of the blades, the fluid control system provides a pressurized fluid (e.g., pressurized air) to the second opening at the suction side surface while reducing or terminating the flow of the pressurized fluid to first opening at the pressure side surface. To reduce the rotation of the blades or to bring the blades to a stop, the fluid control system provides the pressurized fluid to the first opening while reducing or terminating the flow of the pressurized fluid to the second opening. In some cases, the fluid control system independently varies the flow rate of the pressurized fluid to the first and second openings to regulate the torque output of the blades.

In some embodiments variable blowing is provided to alter the lift coefficient ($C_l$) and drag coefficient ($C_d$) of the at least one of the plurality of blades around the rotor azimuth during rotation, which in some cases reduces or eliminates blade wake effects on or around a tower structure having the turbine. In some situations, this also reduces rotor bending moment on the tower.

In an embodiment, span-wise variation of a local blowing coefficient, $C_\mu$ (see below), out at least one of the plurality of blades produces a span-wise distribution of blade section lift and drag loadings at each blade station (or airfoil) as desired. In some cases, $C_\mu$ is between about 0.001 and 0.50 or more, or at least about 0.001, 0.005, 0.01, 0.05, 0.1, 0.15, 0.2, 0.25, 0.3, 0.35, 0.4, 0.45, or 0.5. $C_\mu$ in such cases is defined as follows:

$$C_\mu = \frac{m_{jet} U_{jet}}{\frac{1}{2} \rho_\infty U_\infty^2 A}$$

Which for an incompressible 2d case reduces to >

$$C_\mu = \frac{U_{jet}^2 h_{jet}}{\frac{1}{2} U_\infty^2 c}$$

Forward Blowing Slots

In another aspect of the invention, blades with forward blowing slots are described. In some embodiments, a blade configured to be used in a wind turbine comprises a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces. In some cases, the pressure side and suction side at a root portion of the blade are substantially non-aerodynamic. The blade further comprises one or more openings at the suction side, leading edge and/or trailing edge, the one or more openings directed at an angle between about 0° and 70° with respect to an axis oriented from a centerline of the blade toward the leading edge. In some embodiments, the blade comprises one or more openings at the suction side, leading edge and/or trailing edge, the one or more openings configured to provide a pressurized fluid over the suction side and towards the leading edge of the blade.

In an embodiment, the one or more openings are directed at an angle between about 0° and 25°, or 0° and 15° with respect to an axis oriented form a centerline of the blade toward the leading edge.

In some embodiments, a blade for use in a wind turbine comprises a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces. In some cases, the pressure side and suction side at a root portion of the blade are substantially non-aerodynamic. The blade further comprises one or more forward blowing slots on the suction side. The one or more forward blowing slots are configured to adjust the lift and drag of the blade.

In some cases, the one or more forward blowing slots are disposed at or adjacent the trailing edge. In other cases, the one or more forward blowing slots are disposed at or adjacent a midline of the blade. In other cases, the one or more forward blowing slots are disposed at or adjacent the leading edge. In other cases, the one or more forward blowing slots are disposed at various locations at or between the leading edge and/or the trailing edge. The location may be selected so as to provide a desirable control system for the wind turbine.

In an embodiment, the one or more forward blowing slots are depressed in a surface of the suction side. In another embodiment, the one or more forward blowing slots are at or above the surface of the suction side.

In some embodiments, the blade comprises 2 or more, 3 or more, 4 or more, 5 or more, 6 or more, 7 or more, 8 or more, 9 or more, 10 or more, 20 or more, 30 or more, 40 or more, 50 or more, or 100 or more forward blowing slots.

The use of forward blowing on the suction side (also "low pressure side" herein) of a wind turbine (including wind turbine airfoil) cause flow separation, thereby decreasing lift and increasing drag. This may be used for power, load and safety control. The use of forward blowing can enable the control of a wind turbine rotor without the need for blade pitch. In other cases, the use of forward blowing can decrease the energy or momentum in the boundary layer, thereby driving earlier stall and higher drag. Forward blowing can introduce volume into the boundary layer (in the vicinity of the suction side upon the flow of air over the suction side), thereby driving earlier stall, a larger stall wedge, and higher drag.

In some situations, the location of forward blowing slots may be selected to provide a chord-wise location of jet reach (i.e., the effective location of a perpendicular jet), which may be vary based on blowing pressure (or flow-rate) and volume. The chord-wise location of jet reach, in some cases, moves forward with increasing angle of attack to provide greater effect at higher wind speeds, when it is needed for driving power lower with increasing wind speed.

Forward blowing slots may drive airflow separation to the airfoil nose to provide low pressure (suction) side flow separation, which enables the rotor to be stopped without blade pitch. In some cases, this provides a braking feature for use with wind turbines, which advantageously eliminates the need for mechanical braking devices found in at least some wind turbines currently available.

In some situations, forward blowing slots (for providing forward blowing jets) are embedded or recessed in the suction side. The blowing slots in some cases do not rise above the native airfoil contour. In other cases, the blowing slots are disposed at a surface of the suction side. This aids in minimizing drag and maximizing the lift-to-drag ratio (L/Deq) when not in use. Such a blade may include multiple turning louvers for large volume, and forward facing jet or louver covers for drag minimization when not in use.

In other situations, a blade includes multiple forward blowing slots along the suction side, which may aid optimizing pitch control. In an example, a blade includes a first forward blowing slot at or adjacent a trailing edge of the blade and a second forward blowing slot at or adjacent a midline (or centerline) of the blade. In some cases, the blade includes a third forward blowing slot at or adjacent a leading edge of the blade.

In some embodiments, forward blowing is used in conjunction with other blowing configurations described herein. In an example, forward blowing is used in conjunction with pressure side blowing. In another example, forward blowing is used in conjunction with slots oriented perpendicularly with respect to a suction side or pressure side. In another example, forward blowing is used in conjunction with trailing edge blowing.

In some cases, forward blowing jets are located near trailing edge for use at near rated turbine power, aiding in providing limited flow disturbance and optimum L/Deq when below rated power and highly linear control. In other cases, forward blowing jets are located near the midline of one or more airfoils of the blade for powerful lift control and drag creation in higher wind velocities (or speeds) up toward the cutout speed, with less blowing power requirements than more aft located jets. In other cases, forward blowing jets are located in the forward section of the airfoil (at or near the leading edge) for aiding in stopping the rotor, when required, without design compromises for operating condition control. Forward blowing jets at or near the leading edge may decrease the time required to stop a rotor. In other cases, blades include separate emergency stop ducting in front of the blade shear web.

Figure 12:
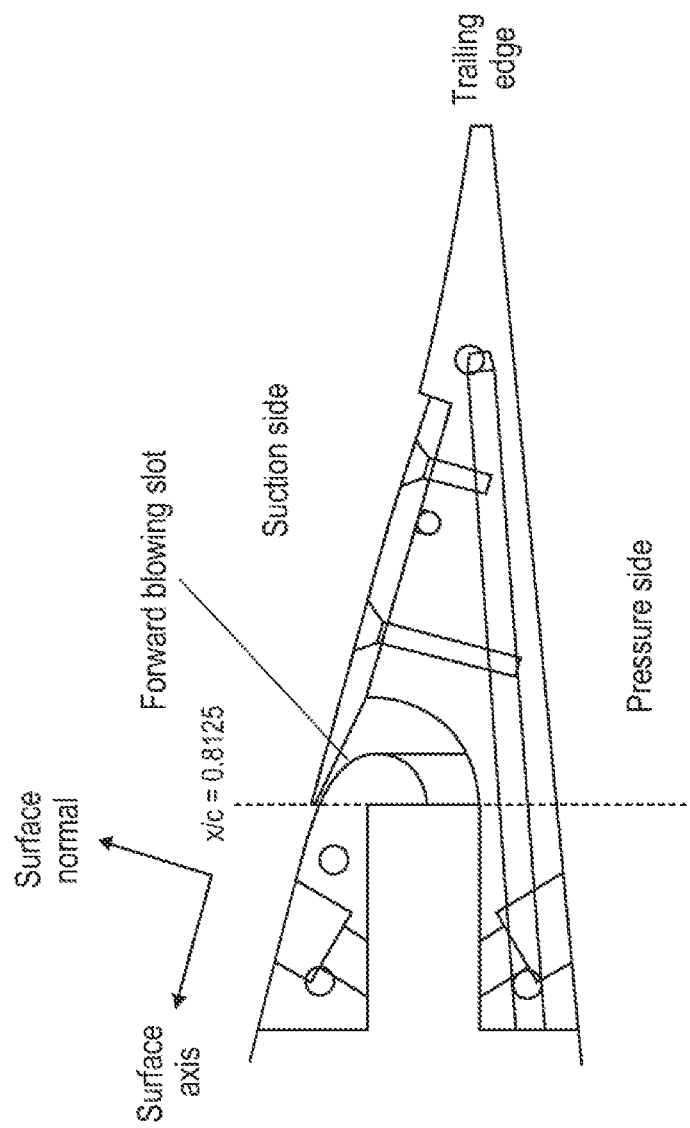
FIG. 12 shows a blade having a forward blowing slot, in accordance with an embodiment of the invention.

FIG. 12 shows a blade with a forward blowing slot, in accordance with an embodiment of the invention. The pressure side, suction side and trailing edge of the blade have been indicated. The forward blowing slot is a slit that runs parallel to the trailing edge. However, other shapes and configurations are possible. In an example, the forward blowing slot is a circular opening. The forward blowing slot directs a pressurized fluid (e.g., air) away from the trailing edge and in the direction of the leading edge.

The forward blowing slot is oriented at an angle between about 0° and 10° with respect to a surface axis (FIG. 12, top left). The surface axis is an axis parallel to a predetermined location of a surface of the suction side at or near the forward blowing slot. The surface axis is orthogonal to a surface normal. The forward blowing slot is generally oriented at an angle between about 0° and 90°, or 0° and 45°, or 0° and 30° with respect to the surface axis. In some embodiments, oriented at an angle of at most about 45°, or 40°, or 35°, or 30°, or 25°, or 20°, or 15°, or 10°, or 9°, or 8°, or 7°, or 6°, or 5°, or 4°, or 3°, or 2°, or 1° with respect to the surface axis. The forward blowing slot is in communication with a passageway that is in fluid communication with a pneumatic control system configured to provide a pressurized fluid (e.g., air) to the forward blowing slot and over the suction side toward the leading edge.

Figure 13:
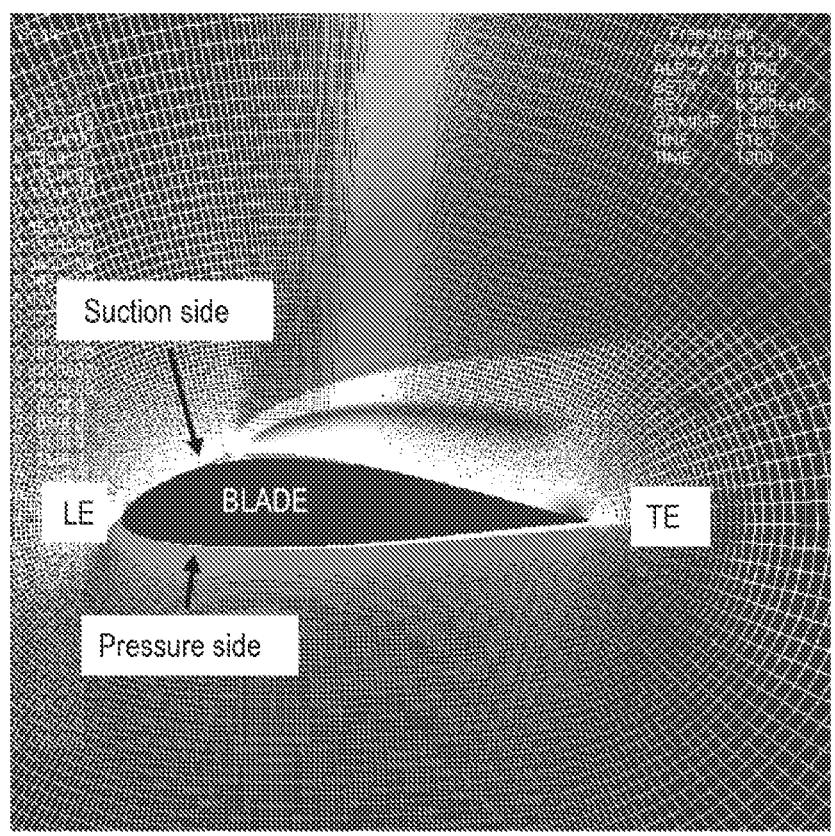
FIG. 13 a flow pattern over a blade having a forward blowing slot between the leading edge and the midline of the blade.

FIG. 13 illustrates a flow pattern over a blade having a forward blowing slot between the leading edge (LE) and the midline of the blade. Forward blowing has effected flow separation over the suction side. The flow has substantially separated from the trailing edge forward to about the quarter chord of the blade. Forward facing slots at or near the leading edge may cause flow separation farther forward (i.e., toward the leading edge) than forward facing slots further away from the leading edge (and toward the trailing edge).

In some embodiments, a blade includes one or more forward blowing slots for providing braking, and one or more blown passages (as described above, such as, for example, in the context of FIG. 6) for improving the effective aerodynamic shape of a blade. In some cases, the combination of forward blowing slots with other slot configurations provides the capability of increasing and decreasing lift.

Turbine Systems

In another aspect of the invention, a system for generating power from wind comprises a blade having a pressure side and suction side meeting at a trailing edge and leading edge, the pressure side having a pressure side surface and the suction side having a suction side surface, the pressure side surface and suction side surface for providing lift to the blade upon the flow of air from the leading edge to the trailing edge and over the pressure side and suction side surfaces, the blade having a substantially non-aerodynamic root portion. The non-aerodynamic (see above) root portion has a shape configured to provide a separated flow of air (or other moving fluid) over the blade. In some embodiments, the shape is as described above.

In some embodiments, the system further includes a control system configured to provide aerodynamic shaping to the blade. This permits the effective shape of the blade to be regulated when desired, such as to improve the aerodynamic lift of the blade or to decrease the aerodynamic lift of the blade, which in some cases is used for braking. Braking is also effected by increase in blade drag due to aerodynamic shaping. In some cases, aerodynamic shaping provided by the control system decreases the separation of the flow of air over the blade, which improves the aerodynamics of the blade.

In some cases, aerodynamic shaping improves the power output of a turbine operatively coupled to the blade by at least about 5%, or at least about 10%, or at least about 15%, or at least about 20%, or at least about 25%, or at least about 30%, or at least about 35%, or at least about 40%, or at least about 45%, or at least about 50%, or at least about 55%, or at least about 60%, or at least about 65%, or at least about 70%, or at least about 75%, or at least about 85%, or at least about 85%, or at least about 90%, or at least about 95%.

In some embodiments, a system for providing aerodynamic shaping to a blade having one or more airfoils comprises a pneumatic control system having a channel in fluid communication with one or more openings ("blown passages") in a suction side or pressure side of the blade having a non-aerodynamic root portion, the pneumatic control system for providing pressurized air to the one or more openings. In some situations, the one or more openings are disposed between about 50% and 100% of a span of the blade as measured from a root of the blade. In an embodiment, the one or more openings are disposed at and/or near a trailing edge of the blade. The system further includes a controller communicatively coupled to the pneumatic control system, the controller having computer-executable commands for regulating the flow rate of pressurized air to the one or more openings. In an embodiment, the pneumatic control system includes a channel in fluid communication with one or more openings in a pressure side of the blade toward a tip portion of the blade.

In some embodiments, the system includes a plurality of blades, at least some of which have one or more blown passages. In example, the system includes three blades angularly separated from one another by about 120° about a central axis. Each individual blade of the three blades includes blown passages for providing aerodynamic shaping to the individual blade. In some cases, however, a subset of the blades includes blown passages, while the remainder of the blades do not include blown passages. In such a case, a pitch control system is provided to regulate the pitch of the blades without blown passages. A pneumatic control system is provided to regulate the flow of air (or other fluid) to blades with blown passages, thereby regulating the aerodynamics of the blades with blown passages.

In some embodiments, a system for providing aerodynamic shaping to a blade comprises a first channel in fluid communication with a first opening in a pressure side or suction side of the blade, the blade having a substantially constant chord toward a root portion of the blade. The system further includes a second channel in fluid communication with a second opening in the pressure side or suction side of the blade. A fluid control system in fluid communication with the first and second channels provides a pressurized fluid to the first and second channels. In some cases, the flow rate of the pressurized fluid to each of the first and second openings is independently selected to control the aerodynamic lift of the blade.

In an embodiment, the first opening is disposed at an outboard portion of the blade and the second opening is disposed at an inboard portion of the blade. In an example, the first opening is disposed at or near a tip portion of the blade and the second opening is disposed at or near a root portion of the blade.

In some situations, the first and second channels are disposed in the blade. In such a case, the first and second channels are oriented span-wise with respect to the blade—i.e., along an axis oriented from a root of the blade to a tip of the blade. The first and second channels are in fluid communication with the first and second openings. In other situations, the first and second channels are in fluid communication with one or more cavities in the blade, which are in fluid communication with the first and second openings.

As described above, various configurations of openings are possible. In an example, the first opening is at or near a root portion or tip portion of the blade and the second opening is at or near the root portion or tip portion of the blade. The first opening in some cases is at or near a leading edge or trailing edge of the blade, or any point in-between. The second opening in some cases is at or near a leading edge or trailing edge of the blade, or any point in-between. In some embodiments, the first opening and/or second opening are circular, oval, elliptical, triangular, square or rectangular cross-section or partial shapes. In an example, the first opening is a slot or slit. The fluid control system is operatively coupled to the first and second channels. In some situations, the fluid control system enables air to be provided to the first and second channels independent from one another. This enables independent control of the flow of air out of the first and second openings.

In some cases, the fluid control system is an air control system (or pneumatic control system) for providing pressurized air to the first and second channel. In other cases, the fluid control system is configured to provide another fluid, such as an inert gas (e.g., He, Ar, $N_2$), to the first and second openings.

In some embodiments, the fluid control system provides a pressurized fluid (e.g., air) to control or regulate an effective aerodynamic shape of the blade. With the aid of the pressurized fluid, the fluid control system increases or decreases the separation of the flow of air over a suction side of the blade. The fluid control system in some cases controls the power or torque output of the blade. In an embodiment, the fluid control system controls the power or torque output in response to an observable, such as a measured wind speed, atmospheric pressure, and/or atmospheric temperature. In some situations, the fluid control system is configured to independently provide the pressurized fluid to the first and second channels to control the effective aerodynamic shape of the blade.

Figure 10:
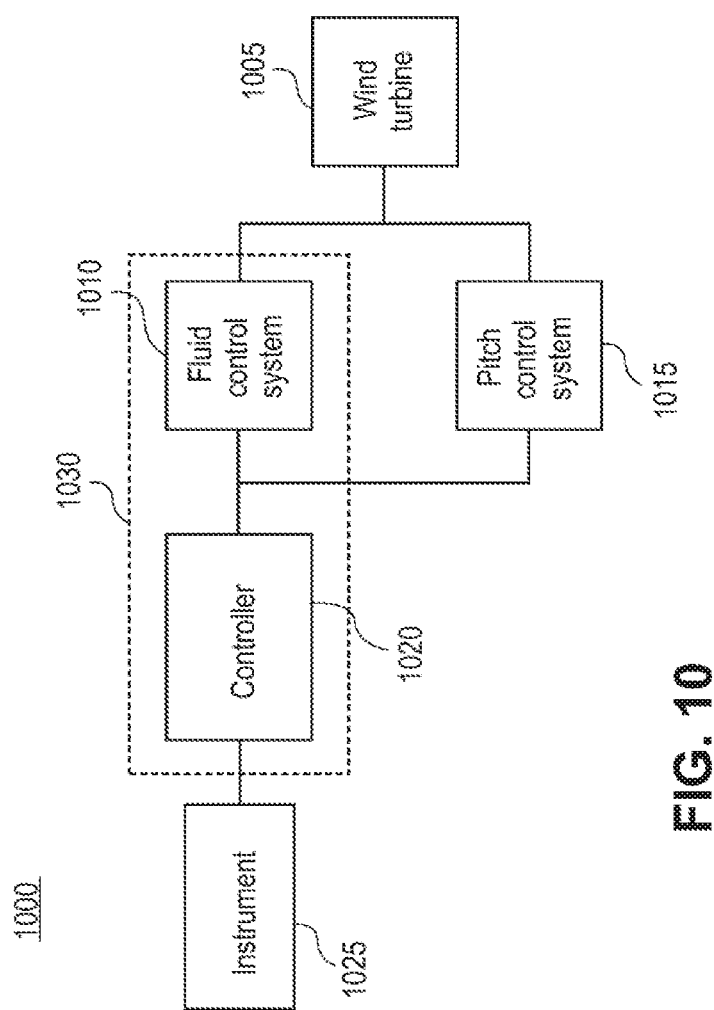
FIG. 10 schematically illustrates a turbine system, in accordance with an embodiment of the invention.

FIG. 10 shows a turbine system 1000, in accordance with an embodiment of the invention. The turbine system 1000 includes a wind turbine 1005 having a rotor operatively coupled to a power generator (not shown). The rotor includes a plurality of blades attached to the hub. At least one of the plurality of blades includes one or more blown passages, as described above. The system 1000 includes a fluid control system 1010 having one or more fluid passages in fluid communication with the one or more blown passages. The system 1000 further include a pitch control system 1015 for regulating a pitch of the blades of the wind turbine 1005. In an embodiment, the pitch control system 1015 includes calibration factors for adjusting a pitch of the blades or an effective shape of the blades. In some embodiments, however, the pitch control system 1015 is precluded if the pitch of the blades is regulated with the aid of the fluid control system 1010 and blown passages, as described herein.

In an embodiment, the fluid control system 1010 is an air control system configured to provide air to the one or more blown passages. In some situations, the air control system includes a computer system with machine readable code to regulate the flow of air to one or more blow passages of the system 1000. In some cases, the air control system is referred to as a pneumatic control system.

The fluid control system 1010 is configured to direct a pressurized fluid (e.g., air) to the one or more blown passages of the at least one of the plurality of blades. The fluid control system 1010 adjusts a power or torque output of the at least one of the plurality of blades having the one or more blown passages. In some situations, the fluid control system 1010 directs another gas, such as an inert gas (e.g., Ar, He, or $N_2$), to the one or more blown passages. In an embodiment, the fluid control system 1010 directs pressurized air at a predetermined pressure through one or more channels to the one or more blown passages, or to one or more cavities in fluid communication with the blown passages.

The system 1000 includes a controller 1020 communicatively coupled to the fluid control system 1010. The controller 1020 collects operating data and compares the operating data to predetermined operating norms. The controller actuates the fluid control system 1010 to urge pressurized air into blow passages at a variable air flow rate. In some cases, the variable flow rate is based upon the comparison between the operating data and predetermined operating norms. Control of the pressurized air aids in controlling of the extraction of power from the wind flowing through a swept area of the wind turbine.

In some cases, the controller 1020 measures operating data and adjusts system inputs to regulate power output and/or structural loads on the wind turbine 1005 at predetermined operating wind conditions. The system 1000 may include at least one instrument 1025 coupled to the wind turbine 1005 that measures the operating data (also "observable" herein). The operating data are selected from various inputs, such as wind velocity, wind temperature, due point, and pressure (e.g., atmospheric pressure). The instrument 1025 is communicatively coupled to the controller 1015.

In an embodiment, the controller 1020 collects operating data from the instrument 1025 and compares the operating data to predetermined operating norms. The controller 1020 actuates the fluid control system 1010 to regulate the pitch and/or an effective shape of the blade based upon the comparison of the operating data and predetermined operating norms.

The system 1000 further includes a stand (tower) with a base, a free end and a stand axis (not shown). The wind turbine 1005 is supported by the stand. The base is secured to a support surface. The wind turbine 1005 includes a drive shaft (or rotor) having a drive shaft axis upon which the drive shaft rotates. The drive shaft is secured adjacent the free end of the stand and is rotatable about the stand axis. At least one blade is secured to the drive shaft and includes a first end, a second end and a passageway (or duct) extending from the first end toward the second end. In an example, the duct extends from the root section of the blade to the tip section of the blade. At least one slot is in communication with the duct and extends along a surface of the blade. The at least one slot is disposed adjacent a trailing edge of the blade. In some situations, at least one slot is disposed adjacent a leading edge of the blade. In some situations, at least one slot is disposed in between the trailing and leading edge of the blade. The fluid control system 1010 is in communication with the duct and the slots of the blade. One or more valves enable the fluid control system 1010 and controller 1020 to regulate the flow of pressurized air (or other fluid) out of the slots of the blade independent from one another. Such valves, for example, enable the fluid control system 1010 and controller 1020 to regulate the flow of air out of one or more leading edge orifices of the blade independent from the flow of air out of one or more trailing edge orifices of the blade.

In some embodiments, the fluid control system 1010 and controller 1020 are collectively referred to as a control system 1030 of the system 1000. In some situations the control system 1030 includes the instrument 1025.

In an embodiment, the controller 1020 includes one or more computers, including a central processing unit (CPU) and electronic storage components (e.g., cache, memory, hard disk) for controlling the fluid control system 1010 with the aid of machine readable, computer-executable commands included in the controller 1020. Such machine readable commands may be stored on a physical storage component (hard disk, cache, memory) of the controller 1020.

In some situations, the fluid control system 1010 adjusts a virtual shape of one or more airfoils of one or more blades of the wind turbine 1005 in fluid communication with the fluid control system 1010. For example, by directing pressurized air to the blown passages, the fluid control system 1010 adjusts a separation of a flow of air from the leading edge to the trailing edge. The fluid control system 1010 adjusts a turning of the flow of air from the leading edge to the trailing edge of the at least one blade having the one or more blown passages. In embodiments, this is accomplished by providing a pressurized fluid to the blown passages, such as by providing the pressurized fluid to the suction side. During use, the fluid control system 1010 is configured to increase or decrease a turning of the flow of air form the leading edge to the trailing edge, thereby increasing or decreasing the lift caused by the flow of air from the leading edge to the trailing edge.

In some situations, the fluid control system 1010, upon direction from the controller 1020, provides pulsed air to the one or more blown passages of the wind turbine 1005. In an embodiment, the pulsed air has a pulse duration up to an including about 0.001 seconds, 0.01 seconds, or 0.1 seconds, or 1 minute, or 2 minutes, or 3 minutes, or 4 minutes, or 5 minutes, or 6 minutes, or 7 minutes, or 8 minutes, or 9 minutes, or 10 minutes, or 15 minutes, or 30 minutes, or 45 minutes, or 1 hour, or 2 hours, or 3 hours, or 5 hours, or 6 hours, or 7 hours, or 8 hours, or 9 hours, or 10 hours, or 11 hours, or 12 hours, or 1 day, or 2 days, or 3 days, or 4 days, or 5 days, or 6 days, or 1 week, or 2 weeks, or 3 weeks or 1 month, or 2 months, or 3 months, or 4 months, or 5 months, or 6 months, or 1 year. In an embodiment, a pulse pressure of the pulsed air is selected to effect a desired flow rate of pulse air out of the one or more blown passages. In some embodiments, the pulse pressure of the pulsed air is at least about 0.000001 atmospheres ("atm"), or 0.00001 atm, or 0.0001 atm, or 0.001 atm, or 0.01 atm, or 0.1 atm, 1 atm, or 2 atm, or 3 atm, or 4 atm, or 5 atm, or 10 atm, or 20 atm, or 30 atm, or 40 atm, or 50 atm, or 100 atm. The pulse duration and/or pulse pressure are selectable to effect a predetermined or desirable aerodynamic shaping of the blade, as described above.

Centrifugal Blowing

The rotation of a blade during operation of a wind turbine can generate a flow of air at or near the root of the blade. In some situations, passages with valves are provided at the root of the blade for enabling air to enter a plenum of the blade from the root and subsequently out of forward blowing slots. This can aid in reducing the rotation of the blade and thus provide a braking motion. In some cases, directing air from an opening at the root of the blade to a forward blowing slot (i.e., slot configured to provide air toward the leading edge of the blade) is referred to as centrifugal blowing.

Figure 14:
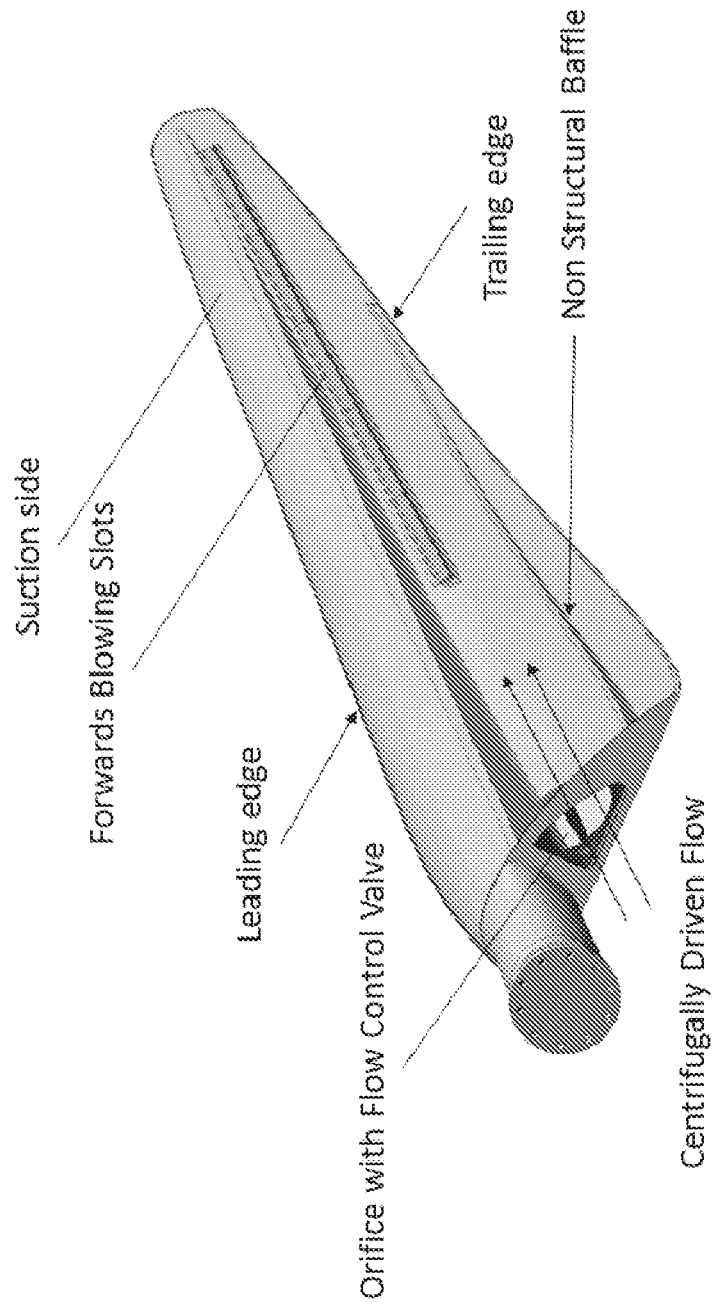
FIG. 14 schematically illustrates a turbine blade with a forward blowing slot, in accordance with an embodiment of the invention.

In an aspect of the invention, blades are provided with the ability to control lift via centrifugal blowing. In some embodiments, there is no auxiliary blower and all of the pumping for forwards blowing comes from the rotation of the wind turbine blade and the subsequent pressure distribution that forms within the blade. The rotation of the blade will build pressure towards the tip of the blade as it rotates. In the case of the forwards blowing slots located on the low pressure (or suction side) of the blade in communication with the interior of the blade, the pressure created by the rotation of the turbine blade is significantly higher than the pressure outside of the slots and airflow from the blade interior out of the slot will exist. In some situations, this airflow will manifest itself at all span-wise locations along the blade, and a user may select the amount of the span covered by the one or more forwards blowing slots. The flow that feeds the interior of the blade and subsequently exits the slots can come from an orifice located at the very root of the blade. This orifice can have a flow control valve such that the flow of air into the blade can be reduced or shut off such that there is little to no flow into the blade interior and therefore no flow out of the forwards blowing slots. A schematic of this system is shown in FIG. 14. The arrows show the direction of centrifugally driven flow, in which air flows from a root portion of the blade and into an air chamber of the blade through an orifice having a flow control valve. The centrifugally driven flow is generated from the rotation of the blade during the operation of the wind turbine.

As forwards blowing is required to provide rotor control this flow control valve can be opened by varying degrees to allow air to flow into the blade interior. The amount of flow that is allowed to enter the blade interior will control the amount of flow that exist the forwards bowing slots. The centrifugally driven system is not restricted to solely forwards facing slots, but can be used to provide air to any orifice located in the blade. Centrifugal blowing may enable power generation control with forwards blowing slots (see FIG. 15 and the accompanying text).

In some embodiments, a blade includes turning vanes within a passageway of the forward blowing slots that remove the spanwise component of flow within the slots such that flow emerging from the slots is predominantly chordwise. In some cases, a blade includes turning vanes that structurally connect a portion of a blade shell on one side of a forward blowing slot (such as toward the leading edge) with a portion of the blade shell on another side of the forward blowing slot (such as toward the trailing edge). This may enable the blade to accurately hold the dimensions of the forward blowing slot to predetermined design values. For example, a blade includes turning vanes that structurally connect the blade shell ahead of the forward blowing (jet) slot with the blade shell aft of the jet slot.

The actual velocity of air that is achieved with centrifugal blowing, in some cases, is the same as the rotation speed of the wind turbine. The inventors have realized that, unexpectedly, directing centrifugal blown air into a root portion of the wind turbine can generate sufficient pressure to force air out of a forward blown slot without the need for compressed air, at a velocity that is sufficiently high to affect the aerodynamic performance of that airfoil section. The location of the forwards blowing slot at a chordwise position such that the local pressure outside of the slot is lower than the pressure caused by centrifugal action can enable significant jet velocities to be achieved. In some cases, the benefits of forward blowing can be realized with only centrifugal blowing and without the need for additional blowing, such as blowing using compressed air. In other cases, however, forwards blowing can be provided with centrifugal blowing in conjunction with pressurized air provided via a compressor.

Figure 25:
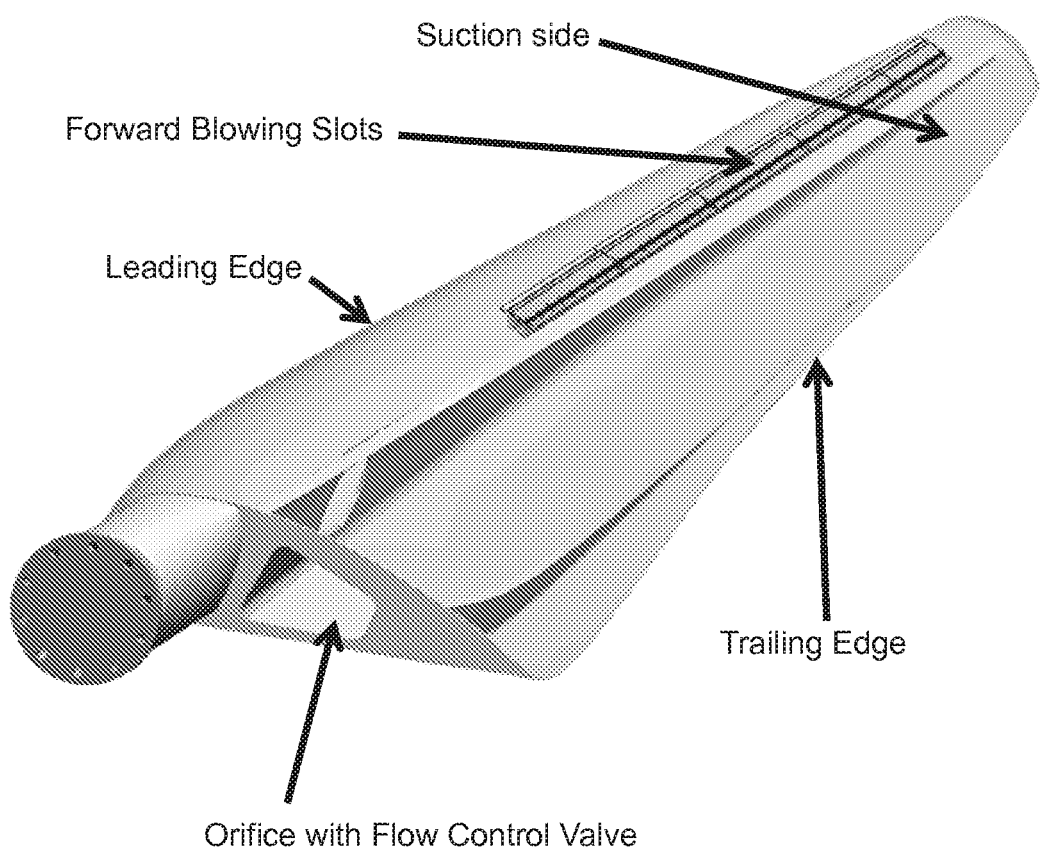
FIG. 25 schematically illustrates a turbine blade with a forward blowing slot near the leading edge of the blade, in accordance with an embodiment of the invention.

FIG. 25 schematically illustrates a turbine blade with a forward blowing slot near the leading edge of the blade, in accordance with an embodiment of the invention.

Figure 20:
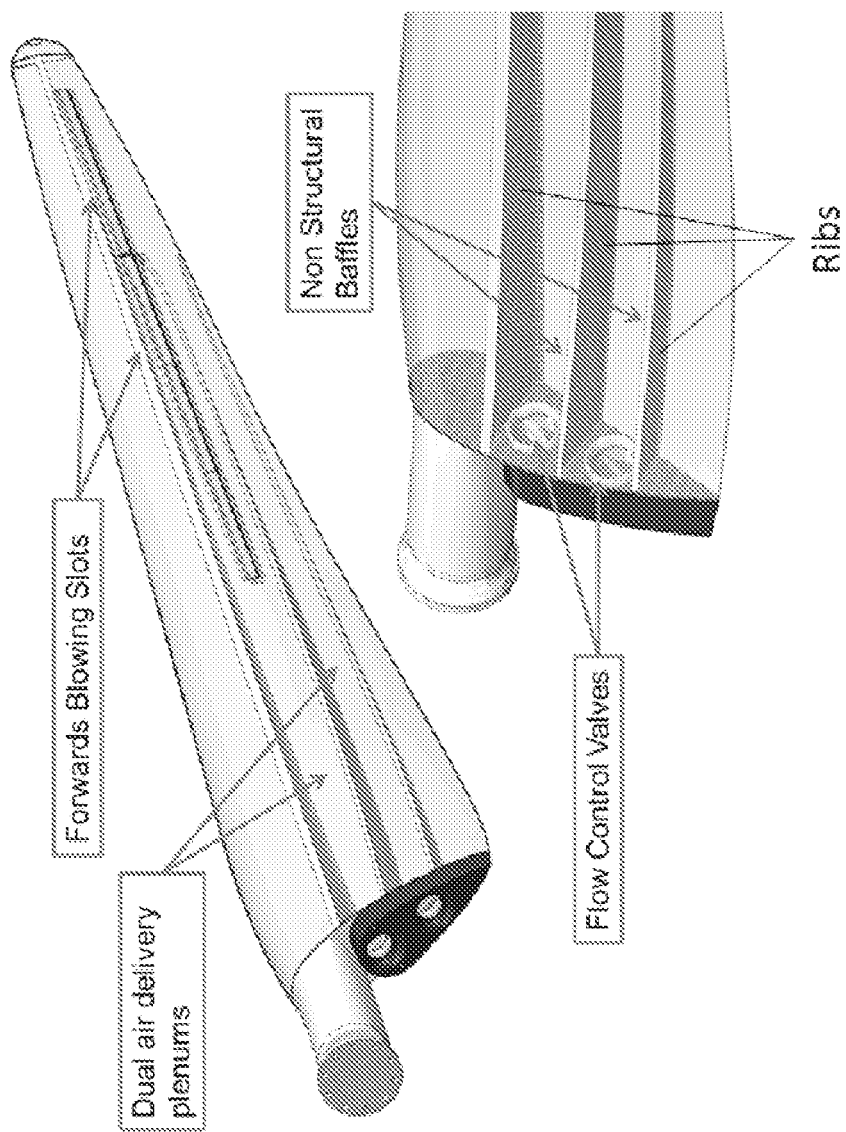
FIG. 20 schematically illustrates a wind turbine blade having dual air delivery plenums, in accordance with an embodiment of the invention.

FIG. 20 shows a blade with a forward blowing slot and two plenums. Each of the plenums is in fluid communication with a portion of the forward blowing slot. The blade of FIG. 20 can provide independent control of forwards blowing by regulating the flow of air into and out of the individual plenums. During operation, air is supplied into a plenum and subsequently out of a portion of the forward blowing slot.

In some embodiments, the flow of air out of a forward blowing slot is regulated by controlling the flow of air into a plenum. For instance, the flow of air out of the forward blowing slot of FIG. 14 is regulated by opening and closing (or partially opening) the flow control valve. The forward blowing slot can include a backflow prevention valve for preventing or minimizing the flow of air from the suction side into the plenum of the blade.

In some embodiments, centrifugal blowing is used with blades that are non-aerodynamic, as described herein.

Methods for Forming Blades

In another aspect of the invention, a method for forming a blade comprises pultruding a composite material through a blade die to form a blade having a pressure side and suction side meeting at a leading edge and trailing edge and extending from a root portion to a tip portion of the blade. The die is shaped such that the root portion of the pultruded blade is substantially non-aerodynamic. In some situations, the composite material is pultruded through the blade die to form the blade.

Next a portion of the suction side is removed. This provides for a space to form one or more openings for blown passages (or openings) of the blade. In some cases, the removed portion of the suction side is at the trailing or leading edge of the suction side.

Next, the removed portion is replaced with a suction side member having one or more fluid passages configured to provide a pressurized fluid (e.g., air) to a surface of the suction side. The one or more fluid passages are configured to be in fluid communication with a fluid control system, as described above. The suction side member is secured to the blade with the aid of one or more fastening members (e.g., screws) or a polymeric material, such as an epoxy.

In some embodiments, a portion of the pressure side is then removed. The removed portion of the pressure side is at the trailing or leading edge of the pressure side. The removed portion of the pressure side is replaced with a pressure side member having one or more fluid passages for providing pressurized air to a surface of the pressure side. The pressure side member is secured to the blade with the aid of one or more fastening members (e.g., screws) or a polymeric material, such as an epoxy.

Figure 11:
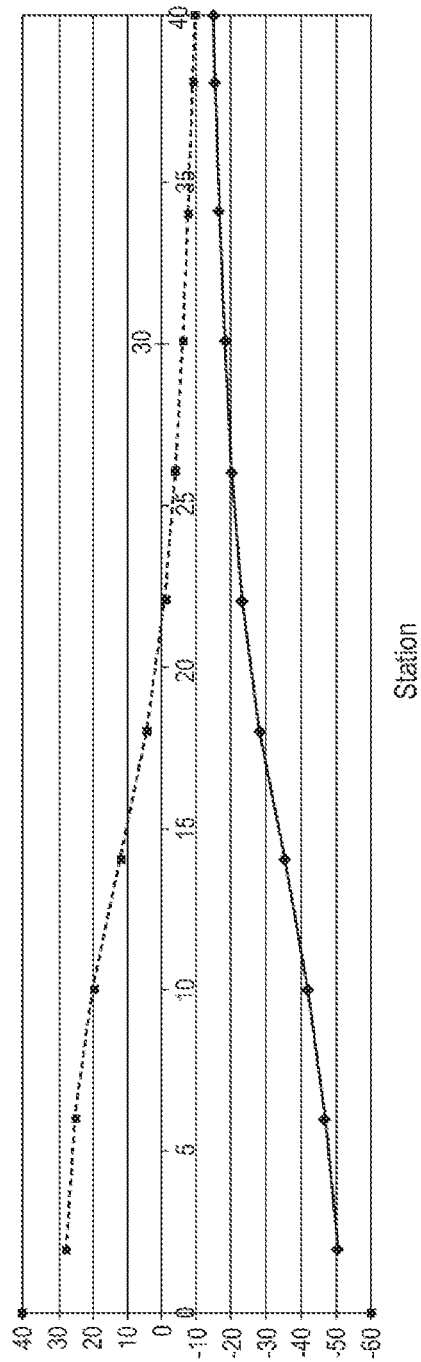
FIG. 11 shows an example of a 40-meter blade having a span-wise thickness profile. The x-axis designates span position along the blade and the y-axis designates the thickness (or chord) of the blade at a particular span position.

In other embodiments, a blade is formed by pultrusion. FIG. 11 shows a span-wise thickness distribution (or profile) for a 40 m blade, in accordance with an embodiment of the invention. In an embodiment, the blade of FIG. 11 is formed by pultrusion by directing a nascent blade material (e.g., fiber, composite material) through a die and heat source with the aid of a pull mechanism. The nascent blade material has a constant cross-section. In some embodiments, the nascent blade material is pulled through a resin and, in some cases, followed by a separate preforming system. The nascent blade material is then directed into a heated die, where the nascent blade material undergoes polymerization to form a blade material.

In an embodiment, the nascent blade material comprises one or more monomeric subunits that are configured to react to form a polymeric material. In an embodiment, the blade material includes one or more materials selected from the group consisting of polyester, polyurethane, vinylester and epoxy.

Pultrusion advantageously permits the formation of substantially uniform fibers, which aids in increased material strength, particularly compression and fatigue strength. For the curvature of the blade of FIG. 11, the resulting induced strain of the blade is less that 50 micro strain units at its maximum for about a one inch by on inch square pultrusion. The thickness distribution of FIG. 11 allows a constant number of square pultrusions to be used, from about 10 m to 22 m.

Backflow Control Valves

In another aspect of the invention, spanwise backflow prevention valves are provided. Spanwise backflow prevention valves can be used with forward blowing slots to mitigate or eliminate air being drawn in and expelled out of regions of differing pressure along the slot length. In some cases, backflow prevention valves prevent or minimize air from entering a blade (such as an air chamber of the blade) from a suction side through a forward blowing, slot. This phenomenon may occur when the air supply duct is sealed off at the root end and is a result of the varying pressure distribution present along the length of the blowing slots. This pressure distribution along with the common duct configuration in its sealed state (where the pressure inside the duct is no longer higher than the pressure outside the blowing slots at all points) may result in some regions of the blowing span to pressurize the duct with respect to others, thereby allowing blowing to occur even with the duct sealed off.

Under normal operating conditions where the plenum is open at the root and pressurized due to centrifugal and or blower pumping, the plenum pressure is above the exit pressures of the slots at all points and the check valves open to allow the slots to blow air as intended. As soon as the plenum is closed, the pressure can drop and the check valves can seal anywhere there is a negative pressure differential between the plenum and slot exit, preventing the plenum from being fed by the slots.

Figure 16:
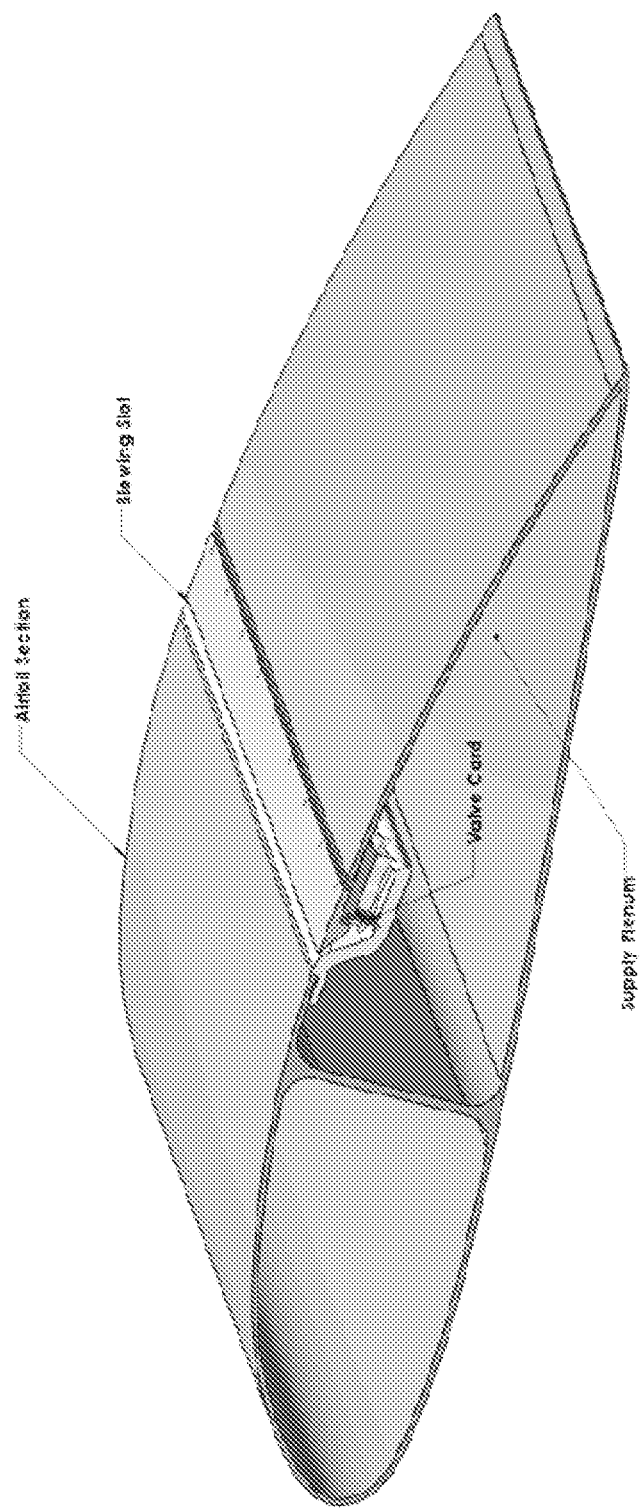
FIG. 16 is a schematic cross-sectional side view of a blade having a forward blown slot, a supply plenum and a valve card, in accordance with an embodiment of the invention.
Figure 17:
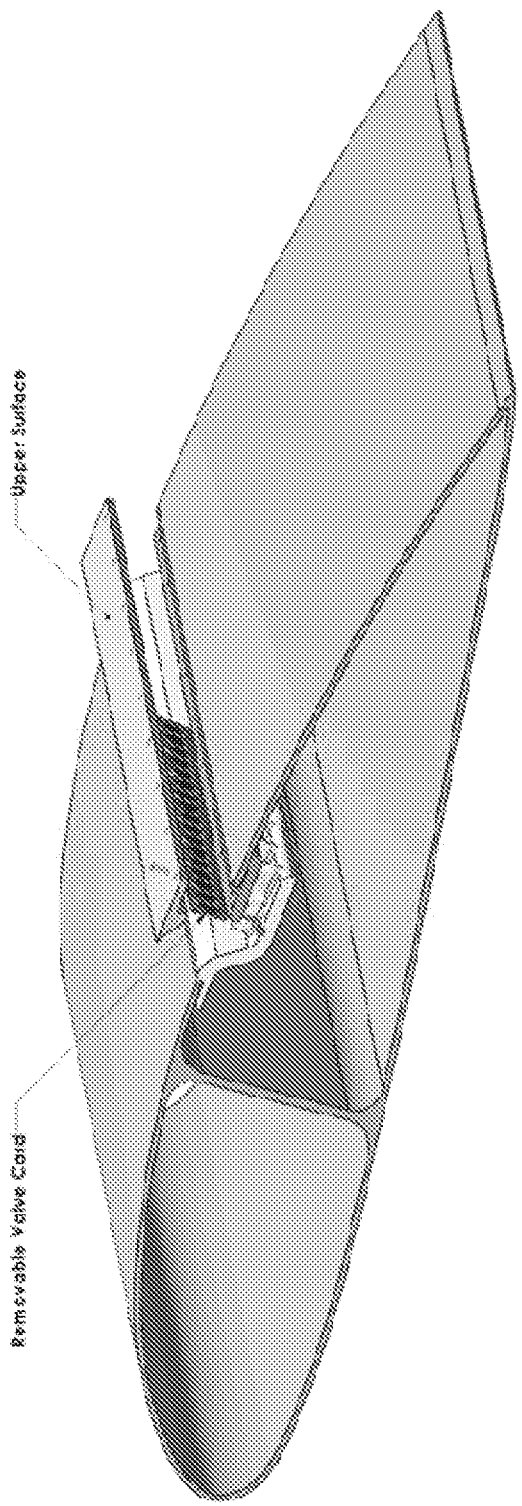
FIG. 17 is a schematic cross-sectional side view of a blade showing a removable valve card, in accordance with an embodiment of the invention.

In some embodiments, the backflow prevention valves are flapper type elastomeric check valves assembled onto a removable card incorporated into the forward blowing slot assemblies near the jet exit point, as shown in FIG. 16. The valve card is removable once the upper surface of the slot is detached facilitating maintenance and inspection (FIG. 17). Locating the valves near the jet exit minimizes the spanwise cross section still available in front of the valves. The inboard implementation of the backflow prevention valves versus a flexible tip seal on the upper surface of the slot prevents the seal from impacting the slot exit geometry under varying pressures. It also allows for a more robust material to be used due to the much larger area available inside the slot assembly.

FIG. 20 shows a turbine blade with dual air delivery plenums (top) that are in fluid communication with a forwards blowing slot. The forwards blowing slot, as shown, is a slit oriented span-wise. The forwards blowing slots directs air over a suction side of the blade and towards a leading edge of the blade. The dual air delivery plenums (or chambers) are in fluid communication with fluid control valves (FIG. 20, bottom). The blade of FIG. 20 does not include structural baffles to form the plenums, which aids in minimizing processing costs. Existing structural members in the blade can also be used to form blade plenums. The forward blowing slot can include backflow valves for preventing the flow of air through the forward blowing slot into the plenums. The blade of FIG. 20 may be used with centrifugal blowing, in which case the openings of the plenums at the root can include valves for regulating the flow of air into the plenums and out of the forward blowing slots.

In some embodiments, a blade with forward blowing slots can have at least 1, or 2, or 3, or 4, or 5, or 6, or 7, or 8, or 9, or 10, or 20, or 30, or 40, or 50, or 100 fluid (e.g., air) delivery plenums (or chambers). Each plenum is in fluid communication with a flow control valve or a plurality of valves for regulating the flow of fluid into the plenum.

Blades provided herein, such as the blade of FIGS. 14 and 20, can include pressure sensors for regulating the pressure of fluid (e.g., air) within various chambers of the blades. In an example, the pressure sensors can help regulate pressure of fluid in the plenums of the blade of FIG. 20, thereby aiding in regulating the flow of fluid out of the forward blowing slots of the blade.

Pitch Scheduling for High Bandwidth Blowing Control

Forward blowing (i.e., directing a fluid, such as air, towards the leading edge of a blade) technology can provide high bandwidth control of rotor power and thrust, allowing the majority of rotor control functions to be performed by forward blowing rather than traditional pitching. The significant control authority coupled with low inertia control valves and rapid aerodynamic response allows forward blowing to have drastically reduced actuation times compared to traditional pitching methods. This control authority offers the additional benefit of a virtually limitless duty cycle. While forward blowing possesses considerable control authority, there are compelling reasons why a low bandwidth pitch controller working in unison with a high bandwidth forward blowing system is advantageous, such as, for example: retention of emergency shutdown and parking features; ability to "trim" or center the forward blowing control envelope around rated power; reduction in mean thrust loads due to base pitch; additional (redundant) aerodynamic brake; extension of forward blowing control authority all the way to cutout.

The pitch control system can be significantly slower than a traditional setup due to the relaxation of the response rate. This may have implications in terms of cost and upkeep of the system, since its duty cycle will be minimal. In some cases, the pitch control can become active above rated system operational guidelines, and will provide a low bandwidth base pitch setting which scales with varying rotor conditions, around which forward blowing will control rotor output at a much higher bandwidth. The pitch controller serves to optimize the control envelope of forward blowing, as well as to provide certain shutdown and ancillary functions.

The advantages of forward blowing technology in a rotor control application are rooted in the ability to vary rotor aerodynamic properties rapidly as compared to a traditional pitch control system. The mechanical components required to operate a forward blown rotor control system are orders of magnitude lighter than their pitch controlled counterparts, in some cases allowing high bandwidth operation that may be unconstrained by duty cycle concerns. A set of one or more control valves can regulate the delivery of air to the forward control sections, with the total system response largely dependent on the valve response and aerodynamic setup time. Forward blown "sections" may be considered to be the activated part of a continuous slot, or individually controlled slots fed by a multi-plenum design. Another factor related to the velocity of propagation of the pressure pulse down the length of the delivery plenum can be considered in larger blades, but is largely dominated by the mechanical and aerodynamic responses. Control valves may be placed further along the blade span to shorten the propagation time, if it is necessary or advantageous for larger blades.

Figure 21:
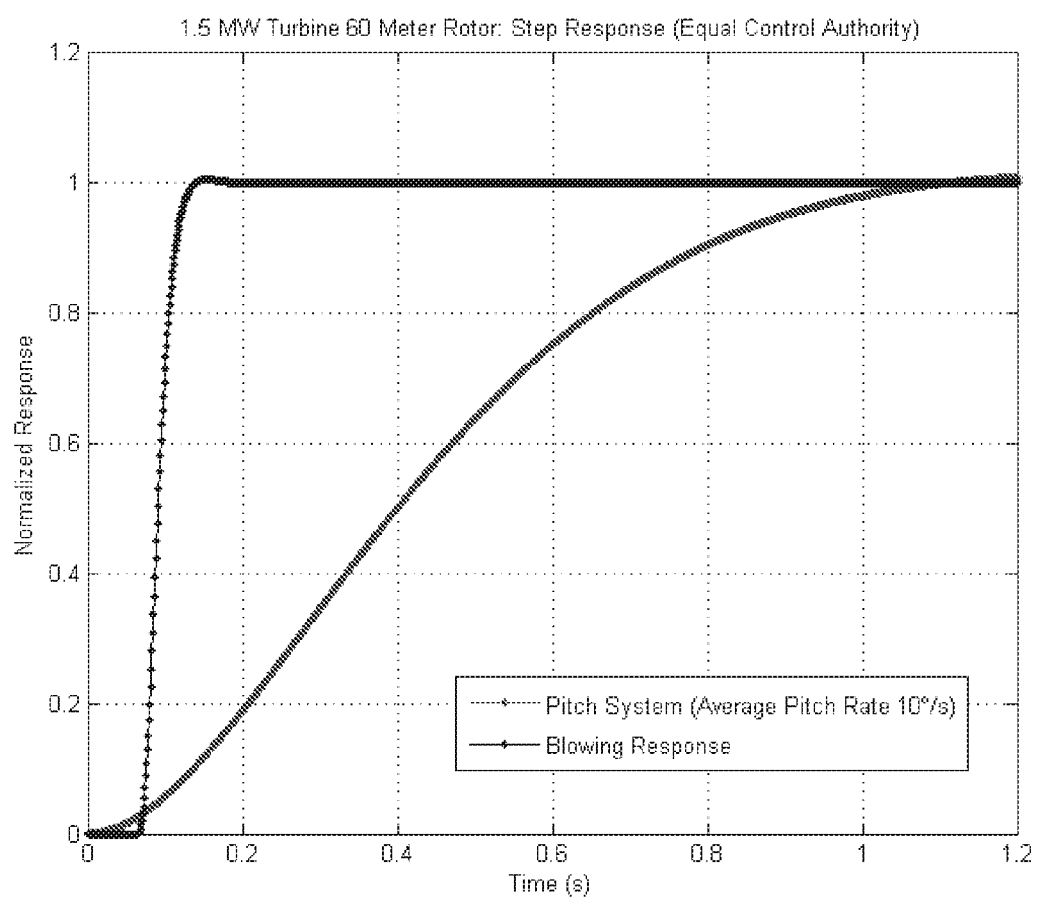
FIG. 21 is a plot of response to an equivalent step disturbance for forward blowing versus pitch control, showing blowing response (top) and pitch system (bottom)

A representative plot of the response to an equivalent step disturbance for forward blowing versus pitch control is shown in FIG. 21. The response of the forward blowing system was modeled using representative control valve characteristics along with allowances for aerodynamic setup time and pressure pulse propagation. The pitch control system parameters were taken from models of turbines in this class.

Figure 22:
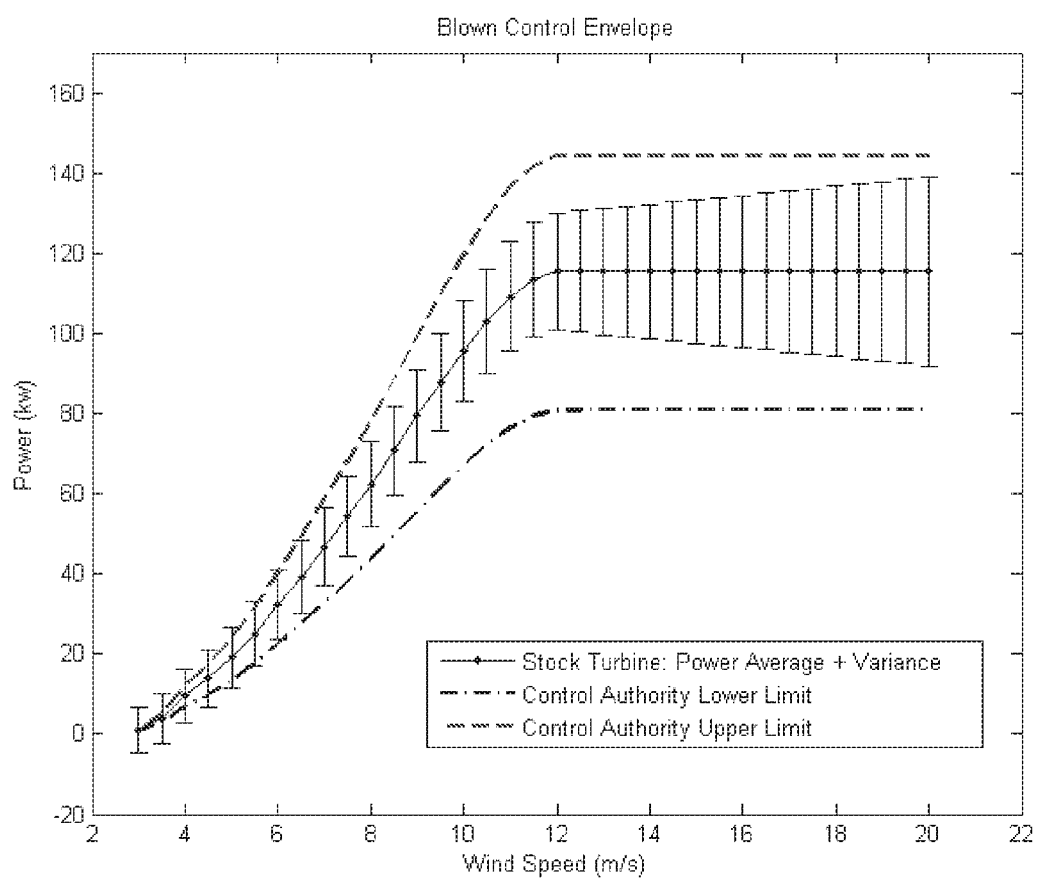
FIG. 22 is a plot of an optimal pitch schedule.

Pitch scheduling in the context of forward blowing involves the application of a base pitch or "trim" setting that allows the control envelope of the forward blowing system to be optimized for a given rotor condition. The application of the pitch schedule can be slow in comparison to the forward blowing response, which is responsible for rotor control around each base pitch setting. As the wind speed increases or decreases, a varying amount of base pitch may be required to optimize the control envelope of forward blowing. The result of an optimal pitch schedule can be seen in FIG. 22, where the forward blown control envelope is centered on the turbines rated power. The excursions from rated as depicted by the error bars are derived from field data, and demonstrate the large power variance experienced by the turbine under pitch only control. It can be seen that these excursions fall well within the control envelope of the forward blowing system with the application of a base pitch schedule. The rapid response of the blowing technology will allow a dramatic reduction in these power variations, as well as tower and blade loads.

Figure 23:
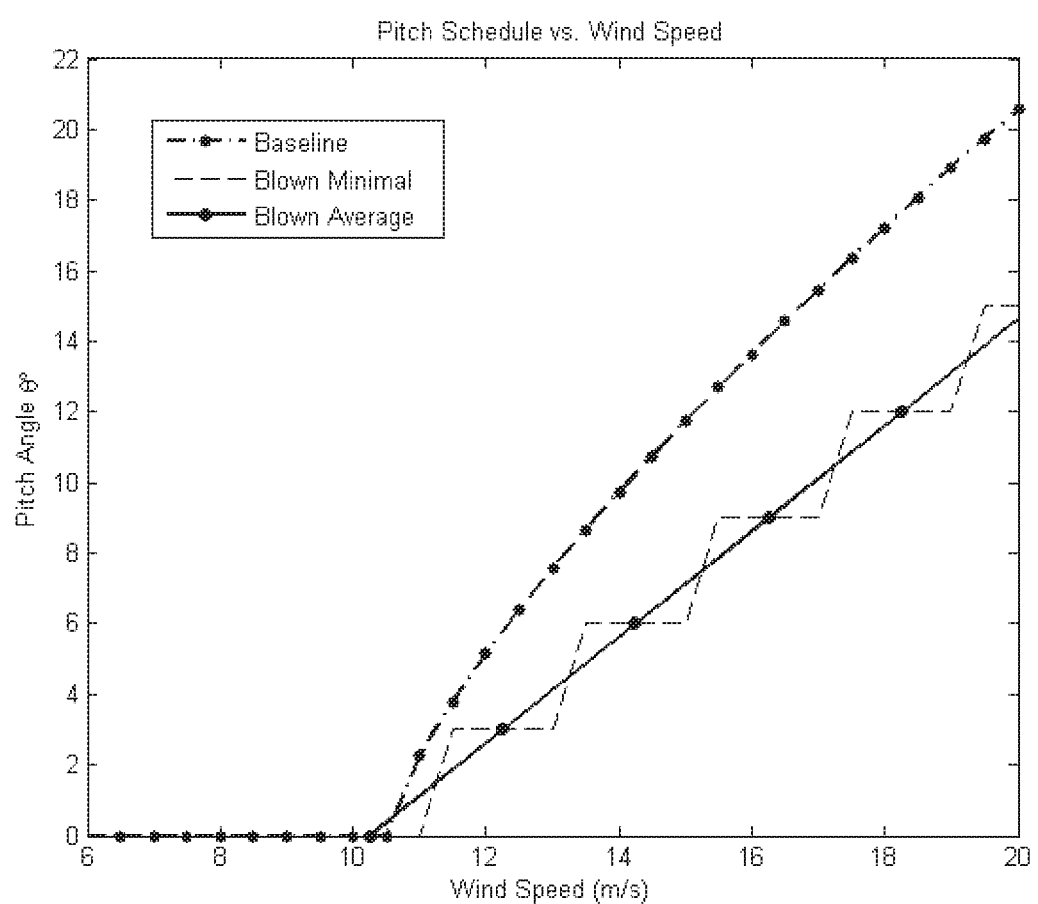
FIG. 23 shows a pitch schedule.

A pitch schedule is presented in FIG. 23, where the steps in pitch are intended to demonstrate that the pitch controller is not required to rapidly track changes in wind speed, only to periodically adjust the forward blowing control envelope.

In some embodiments, forward blowing involves the use of multiple blowing regions which can be independently controlled. In this configuration the forward blowing sections can be activated and controlled independently, such as through the use of separate delivery plenums running the span of the blade. Activating a forward blowing section in this context involves taking the airfoil section out of a passive aerodynamic state by providing a controllable mass flux through the jet slots, such as via root mounted valves. After the desired rotor control function has been performed, the control valves can terminate the flow through the jet slots, placing the airfoil section back into a passive state.

Figure 24:
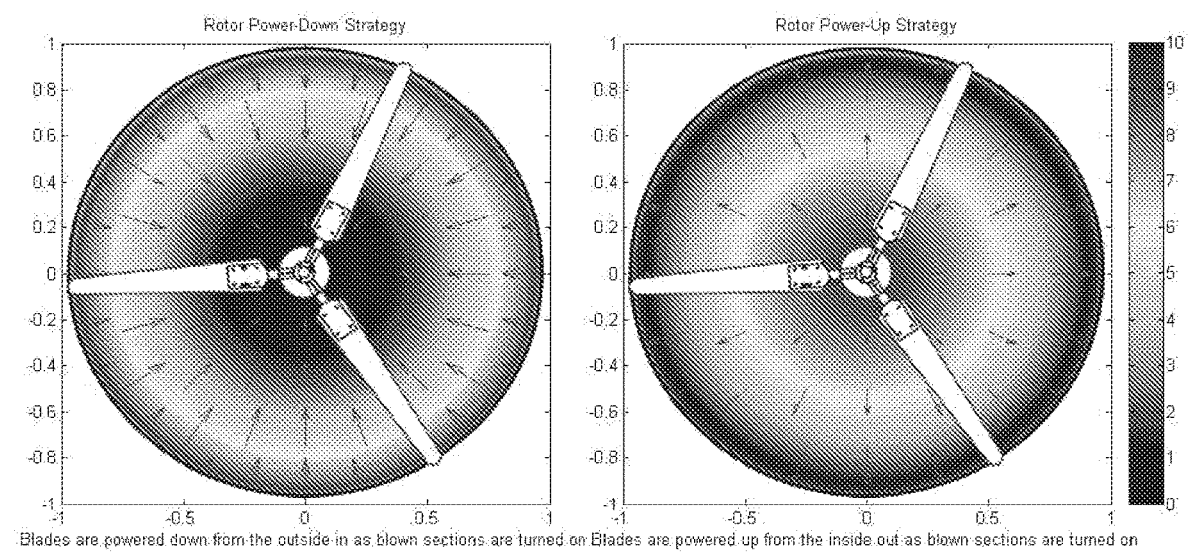
FIG. 24 shows radial control of blowing regions.

An advantage of this type of configuration is the ability to load shift inboard by preferentially activating the forward blowing sections at the tip of the blade, progressing inboard until the desired rotor response is observed. The outermost sections have the largest impact on root bending moments, and as such are activated first in response to changing rotor conditions. Once a transient event has passed and the forward blowing is required to increase rotor power, sections are deactivated in the opposite order, again in an effort to shift load to the inboard regions (see FIG. 24).

There are many possible control schemes which can be applied to a rotor with independently controlled forward blowing sections, just one of which is outlined above. It may be advantageous to adopt different control techniques under differing rotor conditions. Current control inputs include strain gauge data in addition to more typical control variables (e.g., power, wind speed). Strain gauge may provide rapid feedback on the turbine status, which, coupled with a high bandwidth blowing control, may provide highly efficient load mitigation.

Example 1

Figure 15:
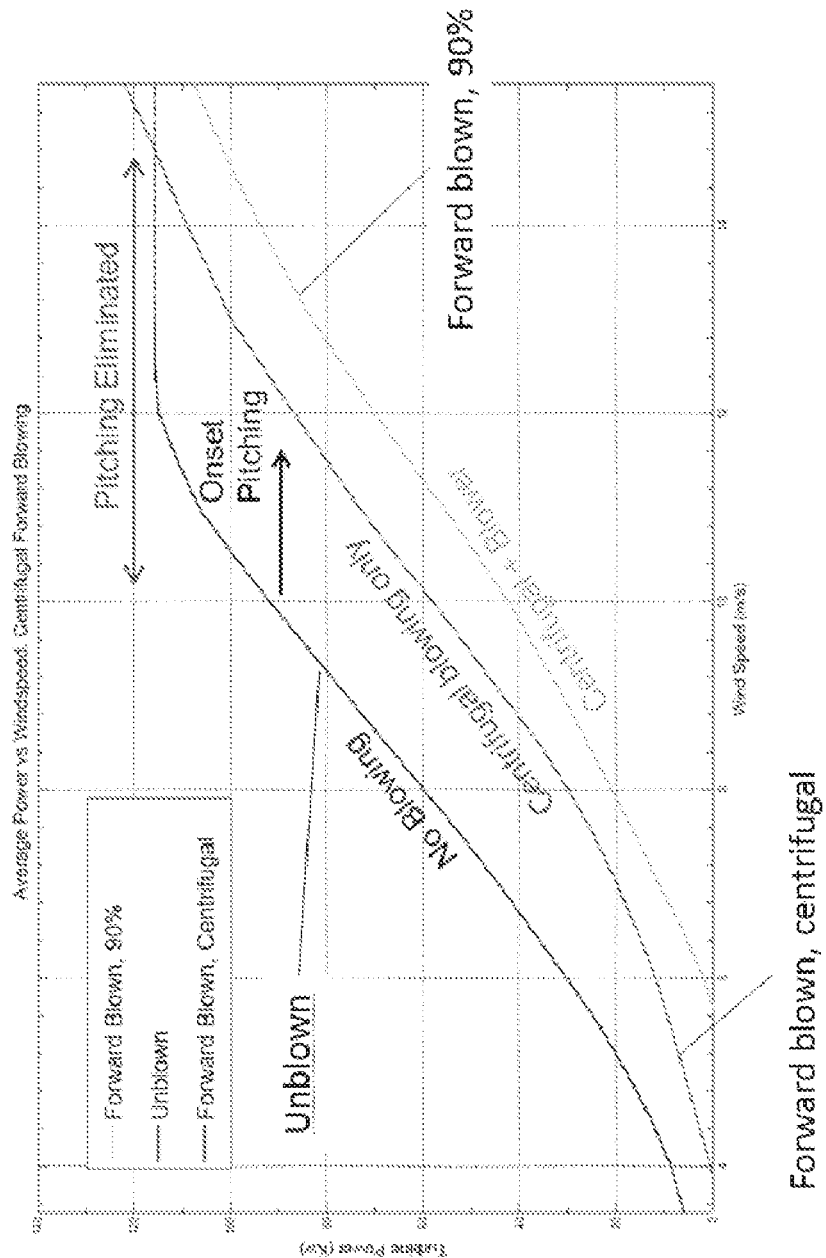
FIG. 15 is a plot of Turbine power (kilowatts, Kw) versus wind speed (m/s) for forward blown, unblown and forward blown (centrifugal) blades.

FIG. 15 shows an example of the level of power generation control that can be achieved with forwards blowing slots. The plot shows the baseline blade power generation and the power generation for the blade with operating forwards blowing slots located at the mid chord position of the airfoil from about 55% to 90% span of the wind turbine blade. Two blowing conditions are shown, one with centrifugally powered blowing alone and one with the air to the forwards blowing slot provided by a combination of an auxiliary blowing system (e.g., 6 kilowatt power consumption) in combination with the centrifugally powered component. It can be seen that significant control (i.e., power reduction) can be achieved with centrifugally driven forwards blowing slots and that the addition of an auxiliary blower can be used to extend the level of power reduction. In some cases, with the use of the forwards blowing slots (and air or other gas provided by the slots) the turbine has no need for pitch until a higher wind speed, as it is below the power that it is rated to generate. Therefore, the forwards blowing system can delay the onset of pitching until a higher wind speed and drastically reduce the duty cycle of a pitch system.

Example 2

Figure 18:
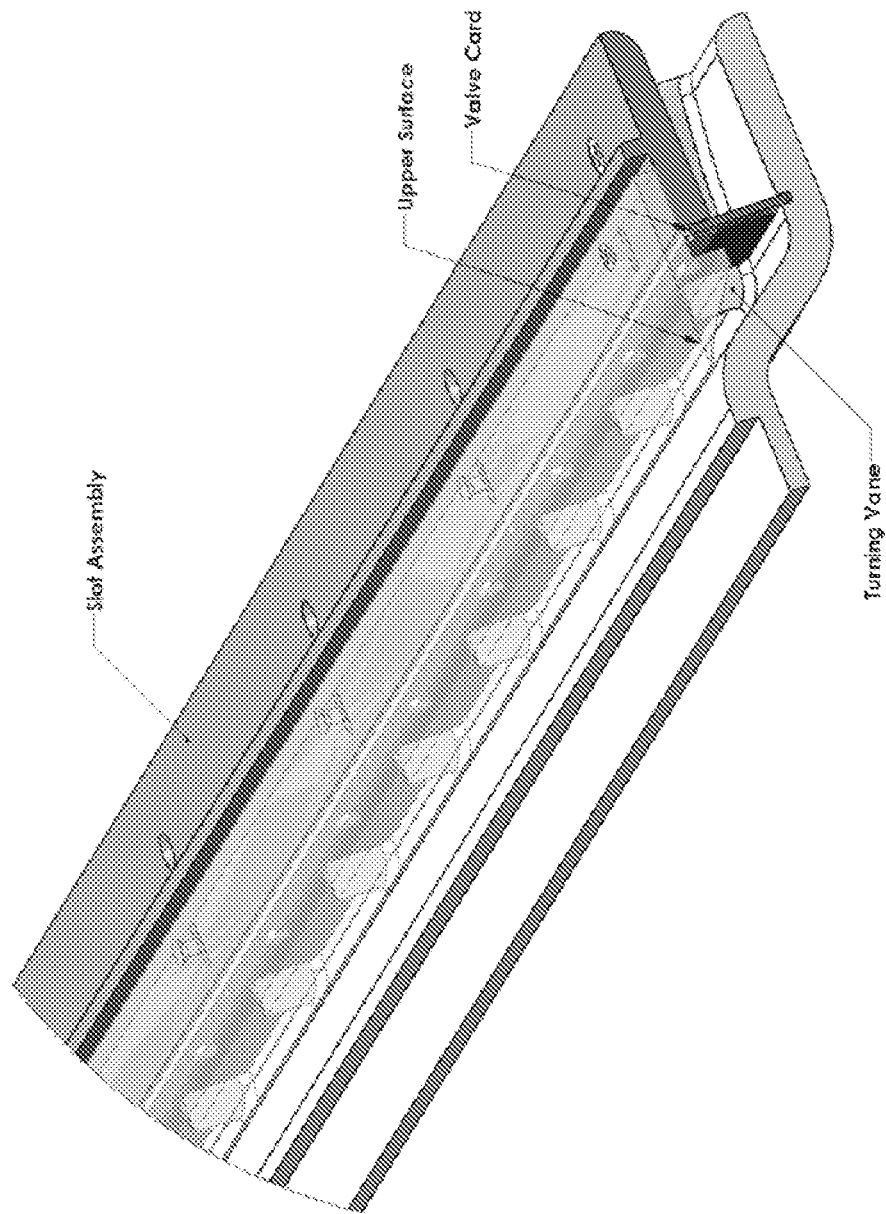
FIG. 18 is a schematic cross-sectional side view of a backflow valve for a blade, in accordance with an embodiment of the invention.
Figure 19:
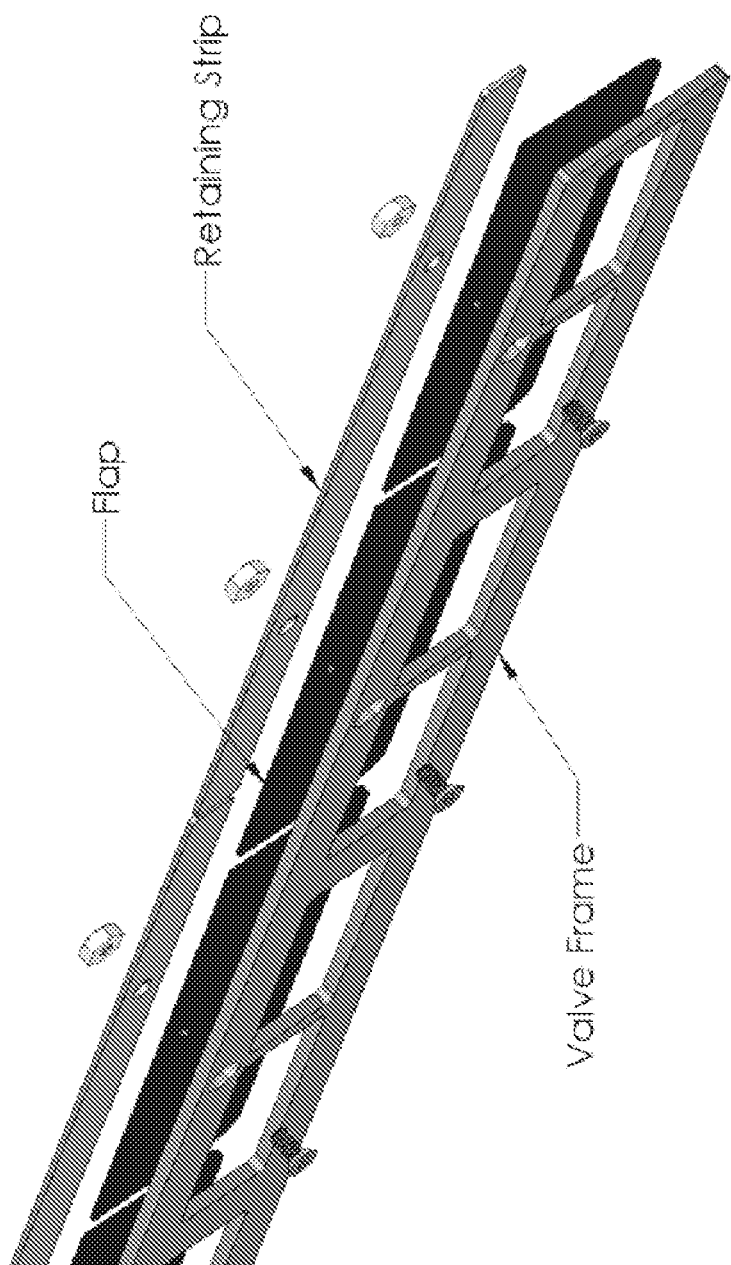
FIG. 19 schematically illustrates a valve card for use with forward blowing slots, in accordance with an embodiment of the invention.

A valve implementation for use in a wind turbine forward blowing slot uses a 0.020" silicone flap mounted to an aluminum frame with room temperature vulcanization (RTV) silicone adhesive and spring steel retaining strips (FIG. 19). The valve card is retained in the slot insert using a channel through the trailing edges of the turning vanes and into the lower surface of the insert. Installation of the upper surface fully retains the valve card, as, can be seen in FIG. 18.

Systems and methods provided herein are combinable with, or modifiable by, other systems and methods, such as, for example, systems and/or methods described in U.S. Pat. No. 6,940,185 to Andersen et al. ("ADVANCED AERODYNAMIC CONTROL SYSTEM FOR A HIGH OUTPUT WIND TURBINE"); U.S. Patent Publication No. 2010/0143122 to Nies et al. ("ACTIVE FLOW CONTROL SYSTEM FOR WIND TURBINE"); U.S. Pat. No. 5,106,265 to A. Holzem ("WIND-TURBINE WING WITH A PNEUMATICALLY ACTIVATED SPOILER"); U.S. Pat. No. 4,197,053 to E. Reinke ("AIR DRIVEN PROPELLER"); U.S. Pat. No. 4,504,192 to Cyrus et al. ("JET SPOILER ARRANGEMENT FOR WIND TURBINE"); U.S. Pat. No. 7,344,360 to Wetzel ("WIND TURBINE ROTOR BLADE WITH IN-PLANE SWEEP AND DEVICES USING SAME, AND METHODS FOR MAKING SAME"); U.S. Patent Publication No. 2010/0143146 to Bell et al. ("FLATBACK INSERT FOR TURBINE BLADES"); GB 02186033A to Somerville; U.S. Provisional Patent Application Ser. No. 61/442,761, filed on Feb. 14, 2011; U.S. patent application Ser. No. 13/185,459 ("TURBINE BLADES, SYSTEMS AND METHODS"); U.S. Provisional Patent Application Ser. No. 61/453,941, filed on Mar. 17, 2011; and U.S. Provisional Patent Application No. 61/509,069, filed on Jul. 18, 2011 ("TURBINES WITH INTEGRATED COMPRESSORS AND POWER GENERATORS"), which are entirely incorporated herein by reference.

Although in some situations the aerodynamics of a non-aerodynamic blade is improved with the aid of pneumatic blowing, in alternative circumstances, the aerodynamics are improved by drawing a vacuum through one or more slots on the pressure side, suction side, leading edge and/or trailing edge of the blade. The vacuum may be drawn with the aid of one or more pumps. The blown slots in such circumstances may be referred to as "vacuum slots."

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

It should be understood from the foregoing that, while particular implementations have been illustrated and described, various modifications may be made thereto and are contemplated herein. It is also not intended that the invention be limited by the specific examples provided within the specification. While the invention has been described with reference to the aforementioned specification, the descriptions and illustrations of embodiments of the invention herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. An airfoil comprising:
    a pressure side and suction side meeting at a trailing edge and a leading edge, the pressure side having a pressure side surface and the suction side having a suction side surface, the pressure side surface and the suction side surface providing lift to the airfoil upon flow of air from the leading edge to the trailing edge and over the pressure side surface and the suction side surface; and
    one or more openings at the suction side, the one or more openings each at an angle between about 0 degrees and 70 degrees with respect to a surface axis that is parallel to the suction side surface at or near a location of the opening, where 0 degrees with respect to the surface axis points along the suction side surface of the airfoil towards the leading edge, wherein the one or more openings provide a pressurized fluid such that a majority of the pressurized fluid flows towards the leading edge of the airfoil along the suction side surface of the airfoil before separating away from the airfoil.

2. The airfoil of claim 1, wherein the one or more openings are at an angle between about 0 degrees and 45 degrees with respect to the surface axis.

3. The airfoil of claim 1, wherein the one or more openings are oriented at an angle between about 0 degrees and 70 degrees with respect to a centerline axis of the airfoil, the centerline axis being a line from the trailing edge of the airfoil to the leading edge of the airfoil.

4. The airfoil of claim 1, wherein the one or more openings are disposed at or adjacent to a midline of the airfoil.

5. The airfoil of claim 1, wherein the one or more openings are disposed between the leading edge of the airfoil and a midline of the airfoil.

6. The airfoil of claim 1, wherein the one or more openings are disposed between a midline of the airfoil and the trailing edge of the airfoil.

7. The airfoil of claim 1, wherein the airfoil is coupled to a device and affects a fluid dynamic force acting upon at least a portion of the device, wherein the fluid dynamic force is selected from a group consisting of an aerodynamic force or a hydrodynamic force.

8. An airfoil comprising:
    a pressure side and suction side meeting at a trailing edge and a leading edge, the pressure side having a pressure side surface and the suction side having a suction side surface, the pressure side surface and the suction side surface providing lift to the airfoil upon flow of air from the leading edge to the trailing edge and over the pressure side surface and the suction side surface; and
    one or more forward blowing slots on the suction side, said one or more forward blowing slots for adjusting the lift and drag of the airfoil by providing a pressurized fluid such that a majority of the pressurized fluid flows towards the leading edge of the airfoil along the suction side surface of the airfoil before leaving the suction side surface of the airfoil.

9. The airfoil of claim 8, wherein the one or more forward blowing slots are depressed in the suction side surface.

10. The airfoil of claim 8, wherein the one or more forward blowing slots are above the suction side surface.

11. The airfoil of claim 8, wherein an orifice of each of the one of more forward blowing slots is disposed along the suction side surface.

12. The airfoil of claim 8, wherein the airfoil includes two or more forward blowing slots.

13. The airfoil of claim 8, wherein the one or more forward blowing slots are disposed between a 20 percent location and an 80 percent location along a chord line of the airfoil.

14. The airfoil of claim 8, wherein the one or more forward blowing slots are disposed at or adjacent to at least one of a plurality of edges of the airfoil, the plurality of edges comprising the leading edge and the trailing edge.

15. The airfoil of claim 8, wherein the one or more forward blowing slots are disposed at or adjacent to a midline of the airfoil.

16. The airfoil of claim 8, wherein the one or more forward blowing slots are disposed between the leading edge and the trailing edge of the airfoil.

17. A system comprising:
    an airfoil coupled to a device, wherein the airfoil affects a fluid dynamic force acting upon at least a portion of the device, wherein the airfoil includes:
        a pressure side and suction side meeting at a trailing edge and a leading edge, the pressure side having a pressure side surface and the suction side having a suction side surface, the pressure side surface and the suction side surface for providing lift to the airfoil upon flow of air from the leading edge to the trailing edge and over the pressure side surface and the suction side surface, and
        one or more openings at the suction side of the airfoil, the one or more openings configured to provide a pressurized fluid such that a majority of the pressurized fluid flows towards the leading edge of the airfoil along the suction side surface of the airfoil before being directed away from the airfoil.

18. The system of claim 17, wherein the device is a wind turbine.

19. The system of claim 17, wherein the device is an aircraft.

20. The system of claim 17, wherein the device is an automobile.

* * * * *